US008335021B2

(12) United States Patent
Tanaka et al.

(10) Patent No.: US 8,335,021 B2
(45) Date of Patent: Dec. 18, 2012

(54) IMAGE READING APPARATUS, SHADING CORRECTION METHOD THEREFOR, AND PROGRAM FOR IMPLEMENTING THE METHOD

(75) Inventors: Jun Tanaka, Chichibu (JP); Takashi Machida, Niiza (JP); Shinobu Kato, Yokohama (JP); Keiji Tsutaoka, Tokyo (JP); Taketo Ochiai, Tokyo (JP); Masahiro Shirai, Tokyo (JP); Shigeru Ikezaki, Wako (JP); Hirotaka Watanabe, Koganei (JP)

(73) Assignee: Canon Denshi Kabushiki Kaisha, Saitama-Ken (JP)

( * ) Notice: Subject to any disclaimer, the term of this patent is extended or adjusted under 35 U.S.C. 154(b) by 1256 days.

(21) Appl. No.: 11/689,130

(22) Filed: Mar. 21, 2007

(65) Prior Publication Data
US 2007/0223062 A1 Sep. 27, 2007

(30) Foreign Application Priority Data

Mar. 22, 2006 (JP) ................................. 2006-079433
Mar. 22, 2006 (JP) ................................. 2006-079435
Mar. 22, 2006 (JP) ................................. 2006-079436
Mar. 22, 2006 (JP) ................................. 2006-079438
Mar. 22, 2006 (JP) ................................. 2006-079439

(51) Int. Cl.
*H04N 1/40* (2006.01)
*H04N 1/04* (2006.01)
(52) U.S. Cl. ......... 358/461; 358/474; 358/497; 358/498
(58) Field of Classification Search ........................ None
See application file for complete search history.

(56) References Cited

U.S. PATENT DOCUMENTS

| 5,125,047 | A | 6/1992 | Ito et al. ........................... 382/65 |
| 6,323,933 | B1* | 11/2001 | Anzai .............................. 355/23 |
| 6,480,300 | B1* | 11/2002 | Aoyama ......................... 358/1.9 |
| 6,809,796 | B2 | 10/2004 | Sugeta ........................... 355/40 |
| 6,989,915 | B2 | 1/2006 | Honjo et al. .................. 358/461 |
| 2002/0034400 | A1* | 3/2002 | Asuwa et al. ................. 399/165 |
| 2002/0039208 | A1 | 4/2002 | Honjo et al. .................. 358/514 |
| 2003/0231288 | A1 | 12/2003 | Sugeta ........................... 355/40 |
| 2005/0206968 | A1* | 9/2005 | Sodeura et al. ............... 358/474 |
| 2005/0259126 | A1* | 11/2005 | Tanaka et al. .................. 347/33 |
| 2006/0023267 | A1* | 2/2006 | Ikeno et al. ................... 358/474 |

(Continued)

FOREIGN PATENT DOCUMENTS

JP 1-300760 12/1989

(Continued)

*Primary Examiner* — Ming Hon
(74) *Attorney, Agent, or Firm* — Fitzpatrick, Cella, Harper & Scinto

(57) ABSTRACT

An image reading apparatus including a shading correction mechanism that can be formed by fewer component parts than conventional ones, and is increased in the degree of freedom of design, thereby enabling reduction of the size and weight thereof. A contact glass guides an original to an image reading position. A glass holding member holds the glass. A line image sensor reads an image on the original conveyed to the image reading location, through the contact glass. A reference member is disposed at a location different from the image reading location on the contact glass. A moving mechanism relatively moves the line image sensor and the reference member so that the line image sensor can alternatively read the original conveyed to the image reading location and the reference member. A drive section externally drives the moving mechanism to move the line image sensor and/or the reference member.

19 Claims, 18 Drawing Sheets

U.S. PATENT DOCUMENTS

| | | |
|---|---|---|
| 2006/0193015 A1 | 8/2006 | Machida ........................ 358/474 |
| 2007/0223061 A1 | 9/2007 | Tanaka et al. .................. 358/497 |

FOREIGN PATENT DOCUMENTS

| | | |
|---|---|---|
| JP | 1-307364 | 12/1989 |
| JP | 3-036855 | 4/1991 |
| JP | 3-094568 | 4/1991 |
| JP | 3-136462 | 6/1991 |
| JP | 03-154563 | 7/1991 |
| JP | 3-165660 | 7/1991 |
| JP | 4-137969 | 5/1992 |
| JP | 4-196669 | 7/1992 |
| JP | 4-225675 | 8/1992 |
| JP | 5-038641 | 5/1993 |
| JP | 5-130330 | 5/1993 |
| JP | 06-070096 | 3/1994 |
| JP | 06-189079 | 7/1994 |
| JP | 6-291938 | 10/1994 |
| JP | 09-065077 | 3/1997 |
| JP | 11-289424 | 10/1999 |
| JP | 11-317830 | 11/1999 |
| JP | 2000-032262 | 1/2000 |
| JP | 2000-059564 | 2/2000 |
| JP | 2001-053934 | 2/2001 |
| JP | 2001-069325 | 3/2001 |
| JP | 2001-313781 | 11/2001 |
| JP | 2002-101266 | 4/2002 |
| JP | 2002-125104 | 4/2002 |
| JP | 2003-202634 | 7/2003 |
| JP | 2004-023276 | 1/2004 |
| JP | 2004-051333 | 2/2004 |
| JP | 2004-064296 | 2/2004 |
| JP | 2004-120599 | 4/2004 |
| JP | 2004-274208 | 9/2004 |
| JP | 2004-282135 | 10/2004 |
| JP | 2004-364180 | 12/2004 |
| JP | 2005-045445 | 2/2005 |
| JP | 2005-102017 | 4/2005 |
| JP | 2005-129986 | 5/2005 |
| JP | 2005-269235 | 9/2005 |
| JP | 2005-343668 | 12/2005 |
| JP | 2006-055497 | 3/2006 |

* cited by examiner

IMAGE READING APPARATUS, SHADING CORRECTION METHOD THEREFOR, AND PROGRAM FOR IMPLEMENTING THE METHOD

BACKGROUND OF THE INVENTION

1. Field of the Invention

The present invention relates to an image reading apparatus configured to read an image formed on an original, while conveying the original, and a shading correction method therefor as well as a program for implementing the method.

2. Description of the Related Art

In general, in an image reading apparatus configured to read an image formed on an original, while conveying the original, the original is illuminated with light from a light source, and reflected light from the original is focused by a rod lens array or the like, whereby the image on the original is read e.g. by a line image sensor. However, due to variations in the amounts of light from the light source and the variations in the performance of the rod lens array and variations in the sensitivity of the line image sensor, it is impossible to perform uniform image reading without any correction.

To enable uniform image reading, image data obtained from an output signal from the line image sensor when an original image is read is corrected using shading correction data formed based on an output signal from the line image sensor obtained when a white reference member is read. When correction data for use in the correction is captured, light amount adjustment for optimizing the amount of light emitted from the light source to illuminate an original, and gain adjustment for optimizing an amplification factor for amplifying image signal output from the line image sensor are carried out. Further, it is a general practice to perform shading correction for correcting the variations in the amounts of light from the light source and the variations in the performance of the rod lens array and the variations in the sensitivity of the line image sensor in association with each pixel thereof. Hereafter, the correction including the light amount adjustment and the gain adjustment performed so as to enable the line image sensor to uniformly read image information from the original will be referred to as "shading correction".

In an image reading apparatus of the above-mentioned type, a member disposed in an original image reading position where the line image sensor reads an image on an original, for supporting a conveyed original from the reverse side of the same original has a color (black in general) other than white for the purpose of detection of a boundary between the original image and the background image, detection of a skew-feeding of the original, and prevention of lack of hiding of a reverse side image of the original.

A description will be given of the schematic arrangement and operation of a conventional typical image reading apparatus with reference to FIG. 18.

The image reading apparatus 1000 shown in FIG. 18 is configured to read image information on an original D by a line image sensor 110 through a contact glass 150 while conveying the original D. The image reading apparatus 1000 includes a pickup roller 2 for picking up originals D, a feed roller 3 for feeding the originals D picked up by the pickup roller 2, a retard roller 4 for separating the picked-up originals D one from another, and a registration roller pair 5 and a convey roller pair 7 each formed by a pair of rollers disposed at respective opposed locations, for conveying the originals D.

First, before reading an image on an original D, the image reading apparatus 1000 moves the line image sensor 110 in a direction indicated by an arrow S in FIG. 18 and causes the line image sensor 110 to read a reference member 170. The reference member 170 is disposed at a location opposed to the line image sensor 110 having been moved in the direction indicated by the arrow S.

Then, image data obtained based on an output from the line image sensor 110 when the line image sensor 110 has read the reference member 170 is stored, as shading correction data for shading correction, in association with each pixel of the line image sensor 110. Thereafter, the image reading apparatus 1000 returns the line image sensor 110 to its original position (original image reading position), and causes the line image sensor 110 to read the image on the original D, while conveying the original D. During the operation for reading the original D, the image data obtained from the output of the line image sensor 110 is corrected by shading correction performed with reference to the correction data stored in advance. It should be noted that whether or not the line image sensor 110 has been moved to a reference member reading position for reading the reference member 170 can be determined based on an output from a position sensor 120. The position sensor 120 is a means for detecting the position of the line image sensor 110.

In the image reading apparatus 1000 configured as above, if the line image sensor 110 deviates from the exact original image reading position when the line image sensor 110 returns from the reference member reading position to the original image reading position, registration error occurs in original reading. This registration error is generally prevented by positioning the line image sensor 110 using the position sensor 120. The above-described sequential operation is commonly performed in response to an instruction from a control means, such as a CPU (Control Processing Unit).

Some image reading apparatuses are configured such that not a line image sensor but a reference member is moved between original reading position and escape position. For example, a technique has been proposed in which the reference member is exposed into an original conveying path during a period of reference member reading, and is retracted to a position where the reference member does not contact with a conveyed original, during a period of original reading (see e.g. Japanese Laid-Open Patent Publication (Kokai) No. 2005-102017).

In an image reading apparatus configured as above such that the relative position between the line image sensor and the reference member is switched between the period of reference member reading and the period of original reading, it is a general practice to detect the image reading position of the line image sensor by the position sensor 120. This is because there is a fear of occurrence of not only the above-mentioned registration error but also damage to the reference member or breakage of a very original.

On the other hand, an image reading apparatus has also been proposed which is configured such that the image reading position is detected without using the position sensor 120. Specifically, first, a reference position detection mark is formed on the reference member, and the line image sensor is moved to a position opposed to the reference member to read the image. Then, the position of the reference position detection mark is determined based on the read image data to thereby determine the original image reading position and the reference member reading position (see e.g. Japanese Laid-Open Patent Publications (Kokai) No. H04-196669 and No. 2004-120599).

In the following, a description will be given of a shading correction mechanism of a conventional image reading apparatus (see e.g. Japanese Laid-Open Patent Publication (Kokai) No. 2005-102017).

FIGS. 19A and 19B are schematic cross-sectional views of an image reading section of the conventional image reading apparatus, in which FIG. 19A shows a state of the image reading section during an original reading period, and FIG. 19B shows a state of the same during a reference member reading period.

As shown in FIG. 19A, during the original reading period, a shading sheet member 54 as the white reference member is kept away from a platen roller 51 as a black opposed member, an image sensor 1901, and an original conveying path.

In addition to the shading sheet member 54, the shading correction mechanism includes an arm 56 as a first swinging member which is swingable, and a sheet table 1903 as a second swinging member which swings about a shaft 1902 on the arm 56. The sheet member 54 is deformably attached to the sheet table 1903.

The arm 56 is held in contact with a stopper 53 by being pulled by a resilient member 59, such as a tension spring. This position is a standby position of the shading sheet member 54 during a period of original conveying.

Further, one end of a gear 58 is attached to a plunger 52 of a solenoid 55, and when the solenoid 55 is energized, the plunger 52 is attracted to the solenoid 55, whereby the gear 58 rotates about a shaft 60 in the clockwise direction. The arm 56 in mesh with the gear 58 rotates about a shaft 57 in the counterclockwise direction in a manner interlocked with the clockwise rotation of the gear 58.

On the other hand, when the platen roller 51, the image sensor 1901, and the original conveying path come into contact with the shading sheet member 54, and the counterclockwise rotation of the arm 56 is stopped, the image reading section enters a state capable of reading the reference member, as shown in FIG. 19B.

More specifically, when the solenoid 55 is energized, the shading sheet member 54 is brought into a gap between the platen roller 51 and the image sensor 1901 by actuation via the gear 58, the arm 56, and the sheet table 1903.

After shading correction data is acquired in this state, when the solenoid 55 is deenergized, the shading sheet member 54 is returned to the above-mentioned standby position by the tension of the resilient member 59.

It should be noted that a plate member, such as a guide plate, can be used as an opposed member to the image sensor 1901 in place of the platen roller 51. Further, the image sensor 1901 can be moved for acquisition of shading correction data, instead of moving the shading sheet member 54.

However, in the image reading apparatus disclosed e.g. in Japanese Laid-Open Patent Publication (Kokai) No. 2005-102017, which is capable of reading both sides of an original, reference members and shading correction mechanisms are required to be disposed at respective locations at which image sensors associated therewith are opposed thereto, and hence the degree of freedom of design is reduced, which makes it difficult to reduce the size and weight of the apparatus.

Further, in the conventional image reading apparatus shown in FIG. 18, it is required to provide the position sensor 120 so as to prevent registration error. Furthermore, in the image reading apparatus disclosed in Japanese Laid-Open Patent Publication (Kokai) No. 2005-102017, since the shading correction mechanisms are provided for causing the reference members to be exposed into the original conveying path, the number of component parts is increased, which complicates the construction of the apparatus.

In addition, in the conventional image reading apparatus, since it is required to provide the shading correction mechanisms in association with the image sensor for reading the front side of an original and the image sensor for reading the reverse side of the same, respectively, the number of component parts is increased, which further complicates the construction of the apparatus. Further, in the conventional image reading apparatus capable of reading of both sides of an original, the locations where the image sensors and those of the shading correction mechanisms can be disposed are limited, and hence the degree of freedom of design is reduced, which makes it difficult to reduce the size and weight of the apparatus.

Further, the conventional image reading apparatus is comprised of an upper unit and a lower unit arranged such that the upper unit can be opened and closed about a hinge, and therefore the opening/closing of the upper unit during a reading operation can cause failure of a shading correction mechanism or breakage of a component part. Furthermore, the image sensors of the conventional image reading apparatus are fixed to the respective upper and lower units, so that in reading a thick original, there is a fear that the original cannot be smoothly conveyed.

Moreover, when the position sensor is disposed in the vicinity of a traveling path of the line image sensor or on the line image sensor, the movement of the line image sensor can be hindered by the position sensor, which increases mechanical limitation.

Even in a case where the position sensor is disposed at a location away from the line image sensor, if a member that operates in a manner interlocked with movement of the line image sensor is additionally provided, the above-mentioned determination can be performed. However, installation of the linkage member not only restricts the construction of the apparatus, but also hinders reduction of the size and weight of the same.

Further, the provision of the position sensor itself leads to an increase in the entire manufacturing cost of the apparatus.

On the other hand, in a case where a reference position mark is formed on the reference member, the reference position mark cannot be disposed on a line along which acquisition of shading correction data is performed by the line image sensor. For this reason, it is necessary to form the reference position mark at a location other than the line for acquisition of shading correction data by the line image sensor, and hence the size of the reference member having the reference position mark additionally formed thereon is inevitably increased, which hinders reduction of the size of the product, i.e. the image reading apparatus. In addition, the reference position mark is required to be formed on the reference member using a member different in color from the reference member, which leads to an increase in the manufacturing cost of the reference member.

Further, unless installation of the position sensor and formation of the reference position mark on the reference member are performed with accuracy, the positioning undesirably varies from one apparatus to another. For this reason, it is required to adjust the location of the position sensor or the reference member and the distance between the reference member reading position and the original image reading position of the line image sensor on an apparatus-by-apparatus basis, which leads to an increase in manufacturing costs.

Further, as shown in FIGS. 19A and 19B, in the above-described conventional image reading apparatus, the mechanism for moving the reference member is complicated, which causes an increase in manufacturing costs. Furthermore, since the mechanism for moving the reference member is formed as a unit independent of the image sensor, adjustment and positioning of component parts is required during assembly, which brings about the problem of degraded assemblability.

Moreover, in the conventional image reading apparatus, the image sensors for reading respective images on both sides of an original and the respective mechanisms for moving the reference members are provided for both sides of the original, the number of component parts is increased, which leads to an increase in manufacturing costs.

SUMMARY OF THE INVENTION

The present invention provides an image reading apparatus which includes a shading correction mechanism that can be formed by fewer component parts than conventional ones, and is increased in the degree of freedom of design, thereby enabling reduction of the size and weight of the apparatus, and a shading correction method therefor as well as a program for implementing the method.

In a first aspect of the present invention, the image reading unit includes a contact glass configured to guide the original to an image reading location, a glass holding member configured to hold the contact glass, an image sensor configured to read the image on the original conveyed to the image reading location, through the contact glass, a reference member disposed at a location different from the image reading location on the contact glass, or on the glass holding member, such that an image of the reference member can be read by the image sensor, and a moving mechanism configured to relatively move the image sensor and the reference member so that the image sensor can alternatively read the original conveyed to the image reading location and the reference member. The driving unit is configured to drive the moving mechanism from outside the image reading unit to move at least one of the image sensor and the reference member. The moving mechanism comprises a traveling member configured to move at least one of the image reading unit and the reference member in a direction different from a longitudinal direction of the image reading unit.

With the arrangement of the first aspect of the present invention, since the moving mechanism comprises a traveling member configured to move at least one of the image reading unit and the reference member in a direction different from a longitudinal direction of the image reading unit. It is possible to form a shading correction mechanism by fewer component parts than conventional apparatuses, and increase the degree of freedom of design, thereby achieving reduction of the size and weight of the apparatus.

The moving mechanism can comprise the traveling member configured to hold the image sensor such that the image sensor can move between a first position for reading the image on the original and a second position for reading the image of the reference member, and an urging member configured to urge the traveling member such that the traveling member moves the image sensor to one of the first position and the second position. The driving unit can comprise an operating member configured to drive the traveling member from the outside of the image reading unit, and a driving power source configured to cause the operating member to operate. The driving power source can cause the operating member to operate for driving the traveling member urged by the urging member, whereby the image sensor is moved to another of the first position and the second position.

The moving mechanism can movably hold the reference member.

The traveling member can be slidably engaged with the image sensor and is moved in a direction orthogonal to a direction in which the image sensor is moved, whereby the image sensor is moved to one of the first position and the second position, and in a state where the traveling member is moved in a direction in which traveling member is urged by the urging member, one end of the traveling member protrudes from the image reading unit.

The operating member can be rotatably disposed such that the operating member comes into contact with the one end of the traveling member protruding from the image reading unit, and when the driving power source causes the operating member to operate, the operating member presses the one end of the traveling member into the image reading unit.

The operating member can have at least one sloping surface formed on a portion thereof for contact with the traveling member.

According to this embodiment, since the operating member can have at least one sloping surface part formed on a portion thereof for contact with the traveling member, it is possible to prevent breakage due to collision between the operating member and the traveling member.

The traveling member can be a cam member.

The image reading apparatus can further comprise an original conveying unit configured to convey an original through a space enclosed by a first frame that can perform turning motion around a pivot shaft and a second frame that supports the pivot shaft of the first frame, and a detect means configured to detect the turning motion of the first frame, and the first frame can hold one of the image reading unit and the driving unit. The second frame can hold another of the image reading unit and the driving unit, control being provided to prevent a driving force of the operating member caused to operate by the driving power source from acting on the traveling member when the turning motion of the first frame is detected by the detect means.

The image reading apparatus can further comprise a second image sensor configured to read an image formed on the other side of the original at a second image reading location, a second contact glass configured to guide the original to the second image reading location, and a second reference member that is configured to allow an image of the second reference member to be read by the second image sensor. The image sensor can read an image formed on the side of the original in the image reading location, and the moving mechanism can move the glass holding member for acquisition of shading correction data. The glass holding member can integrally hold the contact glass, the reference member, and the second reference member, and the moving mechanism can move the glass holding member to thereby move the reference member to the image reading location and the second reference member to the second image reading location.

According to this embodiment, the glass holding member can integrally hold the contact glass, the reference member, and the second reference member. Further, the moving mechanism can move the glass holding member to thereby move the reference member to the image reading position and the second reference member to the second image reading position. This makes it possible to reduce the number of component parts, thereby reliably achieving reduction of the size and weight of the apparatus, which contributes to cost reduction. Further, since it is not required to move the image sensors itself, failure due to movement of cables connecting between the image sensors and an electric circuit board can be eliminated, which enhances reliability and facilitates assembly.

In a second aspect of the present invention, there is provided an image reading apparatus configured to read an image formed on an original, while conveying the original, comprising an image reading unit including an image sensor configured to read an image when the image sensor is in a reading position, a contact glass configured to guide the original to a first position, a reference member disposed at a location different from the first position, and a moving mechanism configured to cause relative reciprocating motion between the reading position and the reference member, a driving unit configured to drive the moving mechanism, and a control unit configured to drivingly control the driving unit such that the reading position of the image sensor during a shading correction data acquisition period is set to a position opposed to a second position set on the reference member, and the reading position of the image sensor during an original image data reading period is set to a position opposed to the first position, wherein the control unit comprises a moving-time read data acquisition means configured to acquire moving-time read data generated based on an output signal from the image sensor, while causing the relative reciprocating motion, a detection means configured to detect, based on the moving-time read data, that the reading position is at a boundary of a disposition area of the reference member, a driving amount acquisition means configured to acquire a driving amount of the driving unit required during a time period from a start of the relative reciprocating motion to a time point when the boundary is detected, and a driving amount calculation means configured to calculate, based on the acquired driving amount, a first driving amount for use in moving the reading position of the image sensor to the position opposed to the first position and a second driving amount for use in moving the reading position to the position opposed to the second position.

With the arrangement of the second aspect of the present invention, based on the moving-time read data acquired while causing relative reciprocating motion between the reading position of the image sensor and the reference member by the moving mechanism driven by the driving unit, it is detected that the reading position is at a boundary of the disposition area of the reference member, and the driving amount of the driving unit required during the time period from the start of the reciprocation to the time point when the boundary is detected is acquired. Then, based on the acquired driving amount, the first driving amount for use in moving the reading position of the image sensor to the first position and the second driving amount for use in moving the reading position to the second position are calculated. This makes it possible to determine an original image reading position and a reference member reading position without installing a position sensor or forming a position detection mark on the reference member, thereby achieving both size/cost reduction and high-accuracy image reading at the same time.

The moving mechanism can move a glass holding member holding at least one of the image sensor and the contact glass.

When the moving-time read data changes across a predetermined threshold value, the detection means detects that the reading position is at the boundary of the disposition area of the reference member.

The image reading apparatus can further comprise a light source configured to illuminate a object on the reading position of the image sensor, and an amplifier means configured to amplify the output signal from the image sensor, and the detection means can increase or decrease at least one value of a illuminating light amount of the light source, an amplification factor of the amplifier means, and the threshold value.

When the detection means cannot perform the detection, calculation of the first and second driving amounts can be suspended until the original is removed from the first position.

The control unit can cause the moving-time read data acquisition means to perform an operation for acquiring the moving-time read data, over a time period during which there occur a first normal-direction moving-time detection of detecting the boundary of the disposition area of the reference member when the reading position of the image sensor is being moved in a normal direction of two directions of the reciprocating motion toward the reference member, an immediately subsequent reverse-direction moving-time detection of detecting the boundary when the reading position of the image sensor is being moved in a reverse direction of the two directions of the reciprocating motion, and an immediately subsequent second normal-direction moving-time detection of detecting the boundary when the reading position of the image sensor is being moved in the normal direction. The calculated second driving amount is equal to an intermediate value between a driving amount required for moving the reading position of the image sensor from an arbitrary initial position until occurrence of the first normal-direction moving-time detection, and a driving amount required for moving the reading position of the image sensor from the arbitrary initial position to occurrence of the immediately subsequent reverse-direction moving-time detection, and the calculated first driving amount is equal to an intermediate value between a driving amount required for moving the reading position of the image sensor from the arbitrary initial position to the occurrence of the reverse-direction moving-time detection, and a driving amount required for moving the reading position of the image sensor from the arbitrary initial position until occurrence of the second normal-direction moving-time detection.

In a third aspect of the present invention, there is provided a shading correction method for an image reading apparatus configured to read an image formed on an original, while conveying the original, wherein the image reading apparatus comprises an image reading unit including an image sensor configured to read the image when the image sensor is in a reading position, a contact glass configured to guide the original to a first position, a reference member disposed at a location different from the first position, and a moving mechanism configured to cause relative reciprocating motion between the reading position and the reference member, and a driving unit configured to drive the moving mechanism. The shading correction method can comprise a control step of drivingly controlling the driving unit such that a reading position of the image sensor during a shading correction data acquisition period is set to a second position set on the reference member, and a reading position of the image sensor during an original image data reading period is set to the first position. The control step comprise a moving-time read data acquisition step of acquiring moving-time read data generated based on an output signal from the image sensor, while causing the relative reciprocating motion, a detection step of detecting, based on the moving-time read data, that the reading position is at a boundary of a disposition area of the reference member, a driving amount acquisition step of acquiring a driving amount of the driving unit required during a time period from a start of the reciprocation to a time point when the boundary is detected, and a driving amount calculation step of calculating, based on the acquired driving amount, a first driving amount for use in moving the reading position to the first position and a second driving amount for use in moving the reading position to the second position.

In a fourth aspect of the present invention, there is provided a program for causing a computer to execute the shading correction method.

In a fifth aspect of the present invention, there is provided an image reading apparatus comprising a frame formed with an opening, an image sensor configured to read an image on a reading position of the image sensor, a contact glass configured to guide an original to an original image reading location, a reference member disposed at a location different from the original image reading location, a moving mechanism configured to reciprocate the reading position of the image sensor between the original image reading location and a shading correction data acquisition position on the reference member, and a driving unit configure to drive the moving mechanism, wherein the frame has the contact glass disposed in the opening, and has the image sensor, the moving mechanism, and the driving unit disposed therein.

With the arrangement of the fifth aspect of the present invention, since the image reading apparatus comprises a frame formed with an opening, and the frame has the contact glass disposed in the opening and has the image sensor, the moving mechanism, and the driving unit installed therein, which makes it possible to simplify the mechanism for moving the image sensor or the reference member. Further, this makes it possible to reduce the size and weight of the apparatus while suppressing increase of the manufacturing costs. Moreover, it is possible to realize a simple and high-accuracy shading correction mechanism which can be assembled without troublesome adjustment and positioning.

In a sixth aspect of the present invention, there is provided an image reading apparatus configured to read an image formed on an original, while conveying the original, comprising an image reading unit including a contact glass configured to guide an original to an image reading location, a glass holding member configured to hold the contact glass, an image sensor configured to read an image formed on a first side of an original conveyed to the image reading location, through the contact glass, a reference member disposed at a location different from the image reading location on the contact glass, or on the glass holding member, such that an image of the reference member can be read by the image sensor, and a moving mechanism configured to relatively move the image sensor and the reference member so that the image sensor can alternatively read the original conveyed to the image reading location and the reference member, a driving unit configured to drive the moving mechanism from outside the reading unit to move at least one of the image sensor and the reference member, and a second image reading unit including a second image sensor configured to read an image formed on a second side of the original in a second reading location, a second contact glass configured to guide the original to the second image reading location, a second glass holding member holding the second contact glass, a second reference member disposed at a location different from the second image reading location on the second contact glass or on the second glass holding member, such that an image of the second reference member can be read by the second image sensor, and a second moving mechanism configured to relatively move the second image sensor and the second reference member so that the second image sensor can read the original conveyed to the second image reading location and the second reference member, alternatively, wherein the driving unit is held by a first frame supporting the image reading unit or a second frame supporting the second image reading unit, and drives both the moving mechanism in the image reading unit and the second moving mechanism in the second image reading unit.

With this arrangement of the sixth aspect of the present invention, the driving unit is held by one of the first frame supporting the image reading unit and the second frame supporting the second image reading unit, and drives both the moving mechanism in the image reading unit and the second moving mechanism in the second image reading unit. Therefore, it is possible to easily form the shading correction mechanism with a reduced number of component parts.

The image reading unit can be movably supported by the first frame.

The second image reading unit can be movably supported by the second frame.

Further, since the moving mechanism is driven by bringing the operating member forming the driving unit into contact with the traveling member protruding from the image reading unit, at least one of the image reading units can be movably supported by the first frame or the second frame, which makes it possible to perform a smooth image reading operation even if the original is thick.

In a seventh aspect of the present invention, there is provided an image reading apparatus configured to read an image formed on an original, while conveying the original, comprising an image reading unit including a contact glass configured to guide the original to an image reading location, a glass holding member configured to hold the contact glass, an image sensor configured to read the image on the original conveyed to the image reading location through the contact glass, a reference member disposed at a location different from the image reading location on the contact glass, or on the glass holding member, such that an image of the reference member can be read by the image sensor, and a moving mechanism configured to relatively move the image sensor and the reference member so that the image sensor can alternatively read the original conveyed to the image reading location and the reference member, and a driving unit configured to drive the moving mechanism from outside the image reading unit to move the image sensor.

The moving mechanism can include a cam member configured to hold the image sensor such that the image sensor can be moved between a first position for reading the image on the original and a second position for reading the reference member.

The above and other objects, features and advantages of the invention will become apparent from the following detailed description taken in conjunction with the accompanying drawings.

BRIEF DESCRIPTION OF THE DRAWINGS

FIGS. 3A and 3B are cross-sectional views of an image reading unit appearing in FIG. 1, in a state during an original reading period, in which:

FIG. 3A shows the image reading unit as viewed vertically; and

FIG. 3B shows the image reading unit as viewed horizontally;

FIGS. 4A and 4B are cross-sectional views of the image reading unit in a state during a reference member reading period, in which:

FIG. 4A shows the image reading unit as viewed vertically; and

FIG. 4B shows the image reading unit as viewed horizontally;

FIGS. 5A and 5B are views of a drive section appearing in FIG. 1 and component parts associated therewith as viewed from above (訳者注：図1との関係を把握するのに大変苦労したので), in which:

FIG. 5A shows a state during the original reading period; and

FIG. 5B shows a state during the reference member reading period;

FIGS. 6A and 6B are views of the drive section and component parts associated therewith, as viewed in an original conveying direction, in which:

FIG. 6A shows a state in which the apparatus is closed during the original reading period; and FIG. 6B shows a state in which the apparatus is open during the reference member reading period;

FIGS. 8A and 8B are partial vertical cross-sectional views showing another example of the image reading unit, in which:

FIG. 8A shows a state during the original reading period; and

FIG. 8B shows a state during the reference member reading period;

FIGS. 9A and 9B are partial vertical cross-sectional views showing still another example of the image reading unit, in which:

FIG. 9A shows a state during the original reading period; and

FIG. 9B shows a state during the reference member reading period;

FIGS. 10A to 10D are partial cross-sectional views showing an example of the layout of a reference member, in which:

FIG. 10A shows a case where the reference member is disposed on an opposite surface of a contact glass from an original conveying surface thereof;

FIG. 10B shows a case where the reference member is disposed on an original conveying surface of a glass holding member;

FIG. 10C shows a case where the reference member is disposed on an opposite surface of the glass holding member from the original conveying surface thereof; and FIG. 10D shows a case where a junction part is omitted from the layout shown in FIG. 10B;

FIGS. 12A and 12B are vertical cross-sectional views showing a variation of the image reading unit, in which:

FIG. 12A shows a state during the original reading period; and

FIG. 12B shows a state during the reference member reading period;

FIGS. 16A and 16B are schematic cross-sectional views of a front-side image reading section and a reverse-side image reading section appearing in FIG. 15, and component parts and elements associated therewith, in which:

FIG. 16A shows an original reading state or an original reading standby state; and FIG. 16B shows a state during correction data acquisition;

FIGS. 19A and 19B are enlarged schematic cross-sectional views of an image reading section of a conventional image reading apparatus, in which:

FIG. 19A shows a state during the original reading period; and

FIG. 19B shows a state during the reference member reading period.

DETAILED DESCRIPTION OF THE PREFERRED EMBODIMENTS

The present invention will now be described in detail with reference to the drawings showing preferred embodiments thereof. It should be noted that the relative arrangement of the components, the numerical expressions and numerical values set forth in these embodiments do not limit the scope of the present invention unless it is specifically stated otherwise.

Figure 1:
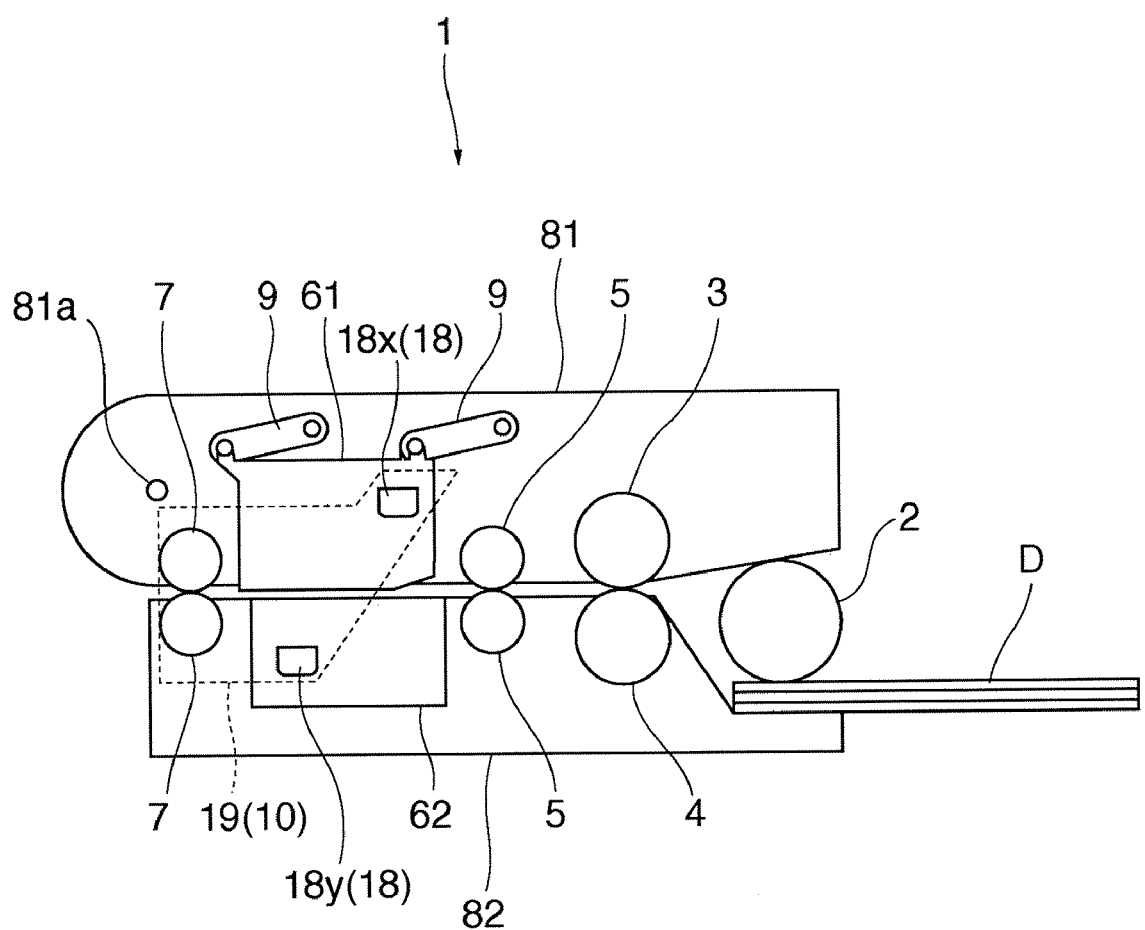
FIG. 1 is a schematic side cross-sectional view showing the internal construction of an image reading apparatus according to a first embodiment of the present invention.

FIG. 1 is a schematic side cross-sectional view showing the internal construction of an image reading apparatus according to a first embodiment of the present invention. The arrangement of the image reading apparatus shown in FIG. 1 is given only by way of example, but it is not limitative.

As shown in FIG. 1, the image reading apparatus 1 is comprised of a pickup roller 2 that picks up originals D, a feed roller 3 that feeds the originals D picked up by the pickup roller 2 into the apparatus 1, a retard roller 4 that separates the picked-up originals D one by one, a pair of registration rollers 5 disposed at respective locations opposed to each other for conveying an original D, an image reading unit 61 that reads image information on the upper surface (surface on a front side) of each original D conveyed by the registration roller pair 5, an image reading unit 62 that reads image information on the lower surface (surface on a reverse side) of each conveyed original D, and a pair of convey rollers 7 disposed at respective locations downstream of the image reading units 61 and 62 in a manner opposed to each other for conveying the original D.

The image reading apparatus 1 has an upper frame 81 pivotally movable about a pivot shaft 81a and a lower frame 82 supporting the pivot shaft 81a, and coveys the original D through a space enclosed by the upper frame 81 and the lower frame 82. The upper frame 81 can be turned (opened/closed) manually so as to allow an original D conveyed and jammed in the apparatus 1 to be removed from the apparatus 1.

The upper frame 81 accommodates the feed roller 3, one of the registration rollers 5, the image reading unit 61, and one of the convey rollers 7, while the lower frame 82 accommodates the retard roller 4, the other one of the registration rollers 5, the image reading unit 62, and the other one of the convey rollers 7. Portions (not shown) supporting the pivot shaft 81a are integrally formed with the lower frame 82, and extend from the respective sides (toward and away from the viewer viewing FIG. 1) in a manner sandwiching the upper frame 81.

The image reading unit 62 is fixed to the lower frame 82. On the other hand, the image reading unit 61 is movably supported on the upper frame 81 by a plurality of swing arms 9. Each of the swing arms 9 has one end thereof supported on the upper frame 81, and the other end thereof supported on the image reading unit 61. This makes the image reading unit 61 vertically movable, so that reading of an image on a thick original and conveyance of the thick original can be performed smoothly. The one end of each swing arm 9 has a snap-fit structure, which facilitates assembly.

Figure 5A:
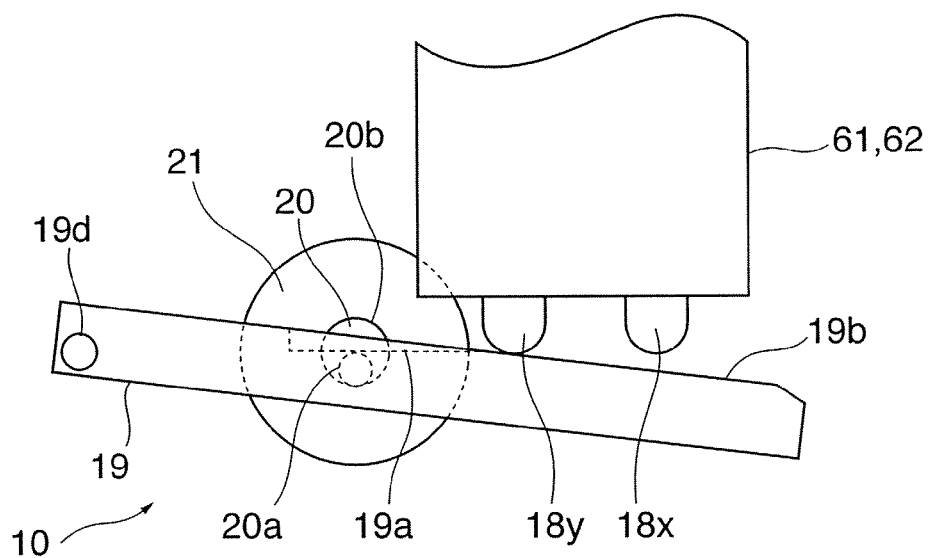

Specifically, the image reading unit 61 and the image reading unit 62 are arranged such that a protruding portion 18$x$ of a slide cam 18 of the image reading unit 61 is positioned farther from a pivot 19$d$ of a pushing member 19 as an operating member than a protruding portion 18$y$ of a slide cam 18 of the reading unit 62 so as to make a difference between the distance from the pivot 19$d$ to the protruding portion 18$x$ and that from the pivot 19$d$ to the protruding portion 18$y$. In the apparatus 1 having the image reading units 61 and 62 thus positioned, during an original reading period, the contact surface 19$b$ of pushing member 19 is brought into contact with the protruding portion 18$y$ as shown in FIG. 5A. At this time, the contact surface 19$b$ of the pushing member 19 is kept from contact with the protruding portion 18$x$. This enables the image reading unit 61 movably supported by the upper frame 81 to vertically move smoothly in accordance with the varying thickness of various originals.

A driving unit 10 is comprised of a drive mechanism and a drive motor accommodated in the vicinity of the portions of the lower frame 82 supporting the pivot shaft 81$a$, for driving the protruding portions 18$x$ and 18$y$ of the respective slide cams 18 that protrude from the side surfaces of the respective image reading units 61 and 62 in the same direction (toward the viewer as viewed in FIG. 1). The pushing member 19 presses the protruding portions 18$x$ and 18$y$ to drive these, whereby the image reading units 61 and 62 are each switched from a state during the original reading period to a state during the reference member reading period.

Next, a description will be given of a sequence of operations carried out by the image reading apparatus 1 for reading an image on an original D.

First, the pushing member 19 as one of component parts forming the driving unit 10 is caused to press the protruding portions 18$x$ and 18$y$ to thereby cause the respective image reading units 61 and 62 to move to the position where the reference members, referred to hereinafter, and cause the line image sensors to read an image of the reference member, respectively. The image reading apparatus 1 generates shading correction data, based on reading signals obtained by the reading, and stores the generated shading correction data on a pixel-by-pixel basis. Thereafter, pressing of the protruding portions 18$x$ and 18$y$ by the pushing member 19 is stopped, and then originals D are fed into the apparatus 1 by the pickup roller 2 and the feed roller 3 and are separated one by one by the retard roller 4.

More specifically, the pushing member 19 presses both the protruding portions 18$x$ and 18$y$ for acquiring of shading correction data. However, after acquiring of shading correction data, the pushing member 19 is inhibited from pressing the protruding portions 18$x$ and 18$y$. Consequently, the image reading units 61 is allowed to vertically move freely for image reading without being pressed by the pushing member 19. Further, at least the protruding portion 18$x$ is kept from contact with the pushing member 19, which allows the image reading unit 61 to vertically move more freely.

While being nipped and conveyed (in a sub-scanning direction) by the registration roller pair 5 and the convey roller pair 7, each original D is repeatedly scanned by the image reading units 61 and 62 in a main scanning direction (i.e. in a direction substantially orthogonal to the original conveying direction), whereby images on the respective upper and lower surfaces of the original D are read. It should be noted that during the original reading period, image data generated based on an output signal from the line image sensor of each of the image reading units 61 and 62 is subjected to shading correction with reference to the stored shading correction data. After the images are read, the original D is nipped and conveyed by the convey roller pair 7 and discharged out of the apparatus 1. Generation and storage of the shading correction data may be performed once for all loaded originals D at the start of reading operation or may be repeatedly performed for every several originals D.

Figure 2:
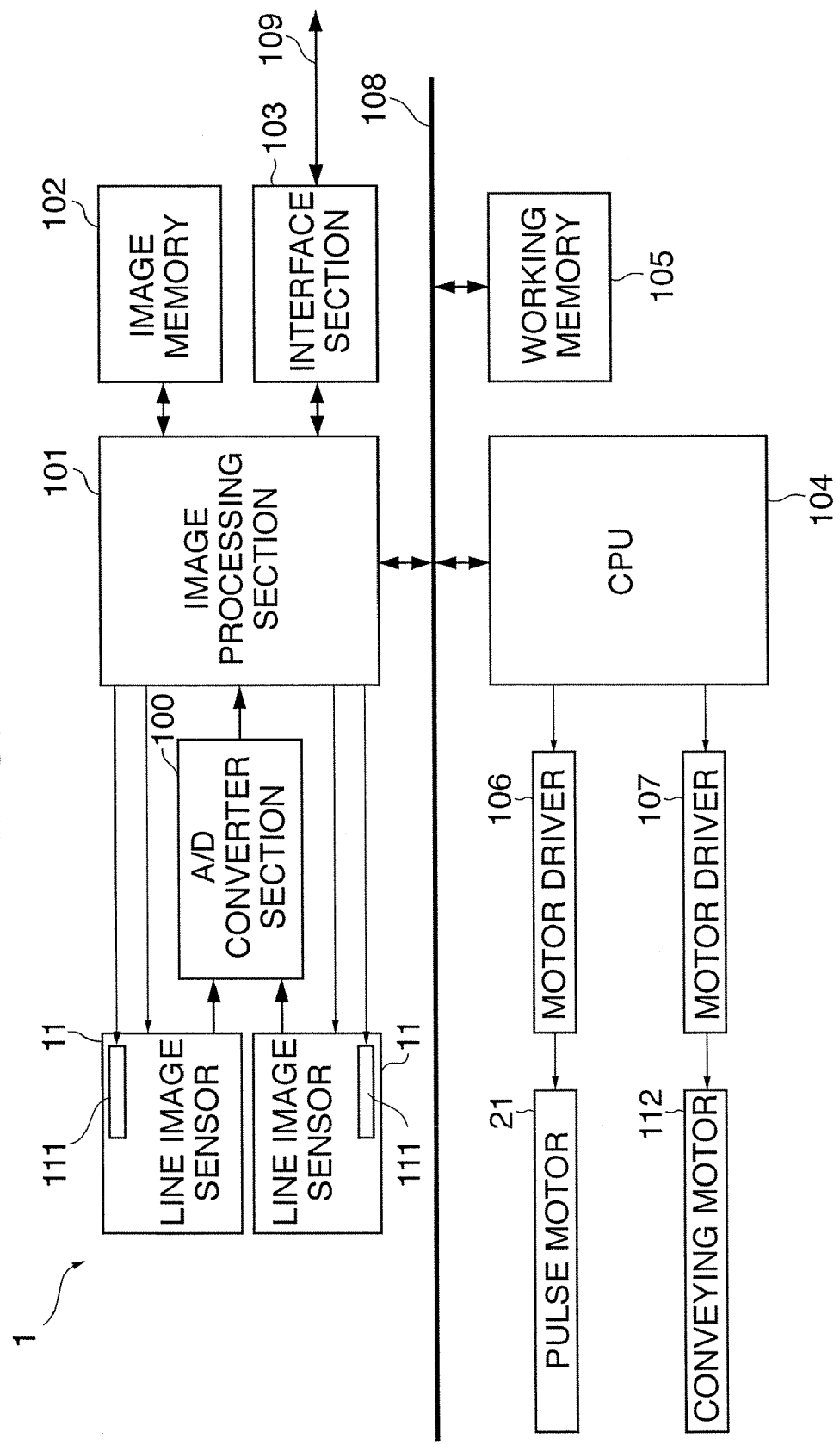
FIG. 2 is a schematic block diagram showing the electrical configuration of the image reading apparatus in FIG. 1.

FIG. 2 is a schematic block diagram showing the electrical configuration of the image reading apparatus 1 in FIG. 1.

In FIG. 2, reference numeral 11 designates the line image sensor (image sensor) provided in each of the image reading units 61 and 62. Reference numeral 111 designates a light source incorporated in the line image sensor 11.

Reference numeral 100 designates an A/D converter section that performs analog processing, such as amplification and black level clamp, on the image signals received from the respective line image sensors 11 and then A/D converts the signals. Reference numeral 101 designates an image processing section that controls the line image sensors 11, the light sources 111, the A/D converter section 100, and so forth, and performs various kinds of image processing (including shading correction) on image data obtained by A/D conversion of the image signals.

Reference numeral 102 designates an image storage section (image memory) that stores image data. Reference numeral 103 designates an interface section that connects the image processing section 101 to an external host apparatus, a network, and so forth via a signal line 109. Reference numeral 104 designates a control section (CPU) that controls the overall operation of the image reading apparatus 1. Reference numeral 105 designates a storage section (working memory) used by the CPU 104 for operation.

The image processing section 101, the CPU 104, and the working memory 105 are interconnected by a bus 108. The CPU 104 is configured to be able to access the image memory 102 via the image processing section 101. Therefore, the CPU 104 can perform processing using image data stored in the image memory 102, according to a program written in the working memory 105.

Reference numeral 112 designates a conveying motor for conveying originals D. The conveying motor 112 operates under the control of a motor driver 107 responsive to an instruction from the CPU 104. A pulse motor 21 is one of the component parts forming the driving unit 10. The pulse motor 21 causes rotating motion of the pushing member 19 to thereby slide the slide cam 18, whereby each of the line image sensors 11 is moved between an original image reading position for reading an image on an original D and a reference member reading position for reading the reference member. The pulse motor 21 operates under the control of a motor driver 106 responsive to an instruction from the CPU 104.

Next, the arrangement of the image reading unit 62 appearing in FIG. 1 will be described with reference to FIGS. 3A and 3B and FIGS. 4A and 4B.

Figure 3A:
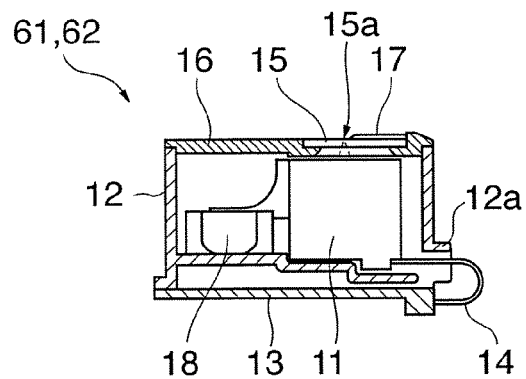
Figure 3B:
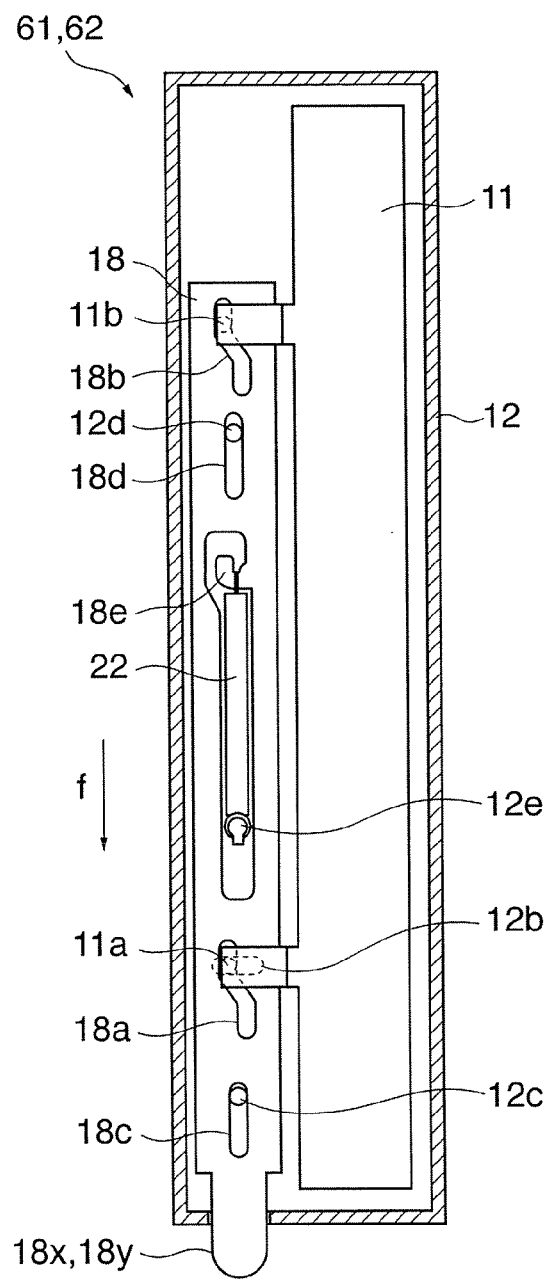
Figure 4A:
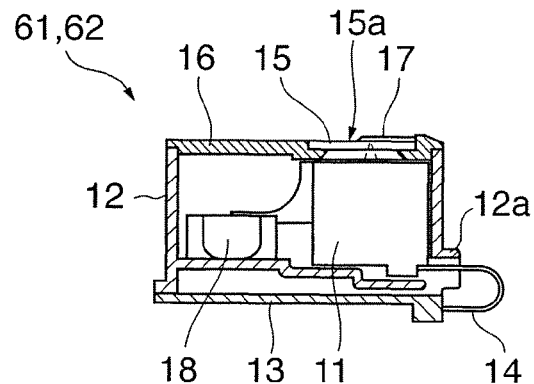
Figure 4B:
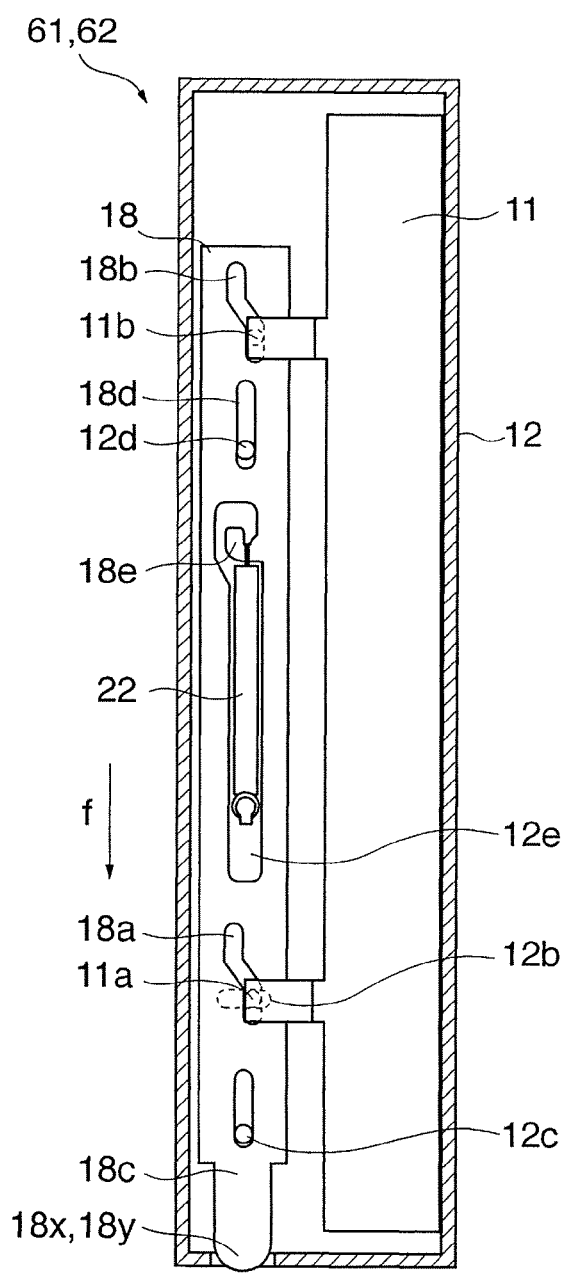

FIG. 3A is a vertical partial cross-sectional view of the image reading unit 62 during the original reading period, while FIG. 3B is a horizontal partial cross-sectional view of the same. FIG. 4A is a vertical partial cross-sectional view of the image reading unit 62 during the reference member reading period, while FIG. 4B is a horizontal partial cross-sectional view of the same. The image reading unit 61 and the image reading unit 62 are identical in construction, and hence a description will be given of the image reading unit 62 alone.

As shown in FIGS. 3A and 3B and FIGS. 4A and 4B, the image reading unit 62 is comprised of the line image sensor 11 that reads images, a frame 12 that accommodates the line image sensor 11, a printed circuit board 13 that causes the line image sensor 11 to operate, a flat cable 14 that connects between the line image sensor 11 and the printed circuit board 13, a contact glass 15 that guides an original D to an original image reading location 15a, a glass holding member 16 that holds the contact glass 15, the reference member 17 having a white reference surface, the slide cam 18 that moves the line image sensor 11 to a predetermined position, and a tension spring 22 that urges the slide cam 18 to return the line image sensor 11 from the predetermined position to its home position.

As shown in FIGS. 3A and 4A, the frame 12 is formed with a through hole 12a through which the flat cable 14 extends. The through hole 12a is formed to have an eaves shape so as to prevent the entry of dirt and dust.

The reference member 17 is disposed on the original conveying surface of the contact glass 15 at a location different from the original image reading location 15a. The white reference surface of the reference member 17, as a portion close to the location corresponding to the reference member reading position, is held in intimate contact with the contact glass 15 by bonding, adhesion using an adhesive tape, or any other suitable method. Alternatively, the reference member 17 may be formed on the contact glass 15 by coating or printing. Therefore, the white reference surface is prevented from being damaged even when a conveyed original D rubs against the reference member 17, or from losing whiteness due to attachment of paper powder or dirt thereto.

The line image sensor 11 has protrusions 11a and 11b each protruding rearward as viewed in FIG. 3B. The protrusion 11a is fitted in a cam groove 18a formed in the slide cam 18. Further, the protrusion 11a is fitted through an elongated hole 12b formed in the frame 12, whereby the movement of the line image sensor 11 in the main scanning direction is restricted. On the other hand, the protrusion 11b is fitted in a cam groove 18b also formed in the slide cam 18.

The slide cam 18 is formed with the cam grooves 18a and 18b in which the protrusions 11a and 11b are fitted, respectively, elongated holes 18c and 18d in which protrusions 12c and 12d protruding from the frame 12 are fitted, respectively, and a hook part 18e to which the tension spring 22 is hooked.

The slide cam 18 is held on a holding part 12e of the frame 12 by the tension spring 22 under tension acting in a direction indicated by an arrow f in FIGS. 3B and 4B. During the original reading period, as shown in FIG. 3B, the protruding portion 18y as one end of the slide cam 18 (the protruding portion 18x in the case of the image reading unit 61) is held in a state protruding from the frame 12. On the other hand, during the reference member reading period, as shown in FIG. 4B, the protruding portion 18y as one end of the slide cam 18 (the protruding portion 18x in the case of the image reading unit 61) is held in a state retracted in the frame 12 of the image reading units 62.

The slide cam 18 is thus slidably engaged with the line image sensor 11, and is driven in the main scanning direction i.e. in the longitudinal direction of the line image sensor 11, whereby the line image sensor 11 can be moved according to the shapes of the cam grooves 18a and 18b in the sub scanning direction to one of the original image reading position and the reference member reading position.

Next, the arrangement of the driving unit 10 appearing in FIG. 1 will be described with reference to FIGS. 5A and 5B and FIGS. 6A and 6B.

Figure 5B:
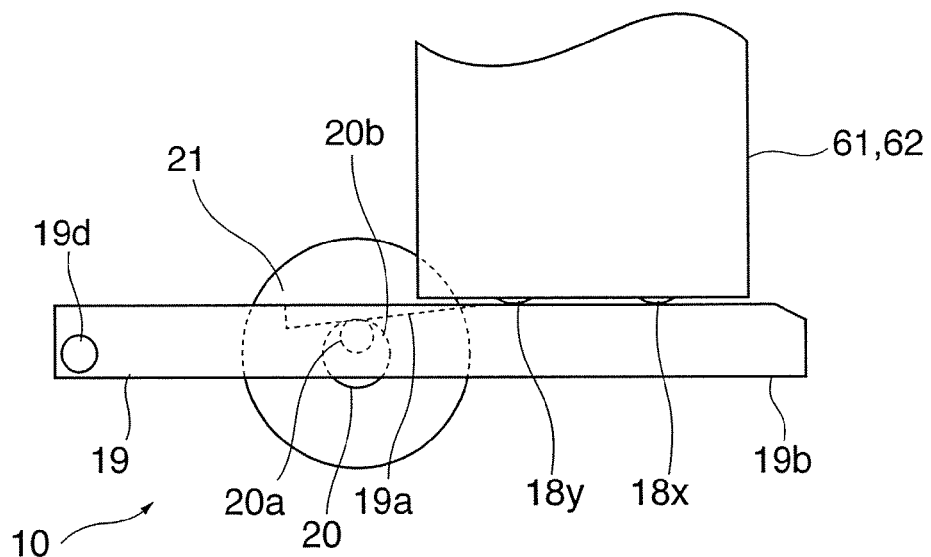

FIGS. 5A and 5B are views of the driving unit 10 and component parts associated therewith, as viewed from above, in which FIG. 5A shows a state during the original reading period, and FIG. 5B shows a state during the reference member reading period.

As shown in FIGS. 5A and 5B, the protruding portion 18x is an end portion of the slide cam 18 protruding from a side surface of the image reading unit 62, and the protruding portion 18y is an end portion of the slide cam 18 protruding from a side surface of the image reading unit 61.

The driving unit 10 is comprised of the pushing member 19 for pushing in the protruding portions 18x and 18y, an eccentric cam 20 for transmitting a driving force to the pushing member 19, and the pulse motor 21 for rotating the eccentric cam 20 about a pivot shaft 20b to actuate the pushing member 19.

The pushing member 19 has a contact surface 19a held in contact with an eccentric cylindrical surface 20a of the eccentric cam 20, and the contact surface 19b for being brought into contact with the protruding portions 18x and 18y. The pushing member 19 is configured such that the contact surface 19a held in contact with the eccentric cylindrical surface 20a is pushed by the rotation of the eccentric cam 20 about the axis of the pivot shaft 20b and is rotated about the axis of the pivot shaft 19d. When the pushing member 19 is rotated about the pivot 19d, the ends of the slide cams 18 (protruding portions 18x and 18y) are protruded from the respective image reading units 61 and 62 and/or are pressed into the image reading units 61 and 62, respectively.

Further, with the above-described arrangement, for a reference member reading operation prior to an image reading operation, the image reading apparatus 1 rotates the pulse motor 21 to bring the pushing member 19 and the slide cam 18 into a state shown in FIG. 5B, thereby moving the line image sensor 11 to a position opposed to the reference member 17 (see FIG. 4A). When the line image sensor 11 and the reference member 17 are brought into facing relation such that the reading effective range of the line image sensor 11 is covered by the reference member 17, the line image sensor 11 reads the reference member 17. As a consequence, correction data generated based on an output from the line image sensor 11 is stored, on a pixel-by-pixel basis, as shading correction data for use in shading correction. Thereafter, the image reading apparatus 1 rotates the pulse motor 21 to bring the pushing member 19 and the slide cam 18 into a state shown in FIG. 5A, thereby moving the line image sensor 11 to a position not opposed to the reference member 17 (see FIG. 3A).

According to the above-described embodiment, the driving unit 10 held by the lower frame 82 supporting the image reading unit 62 drives both the slide cam 18 in the image reading unit 61 and the slide cam 18 in the image reading unit 62. This makes it possible to easily construct a mechanism for acquiring shading correction data, with a reduced number of component parts.

Figure 6A:
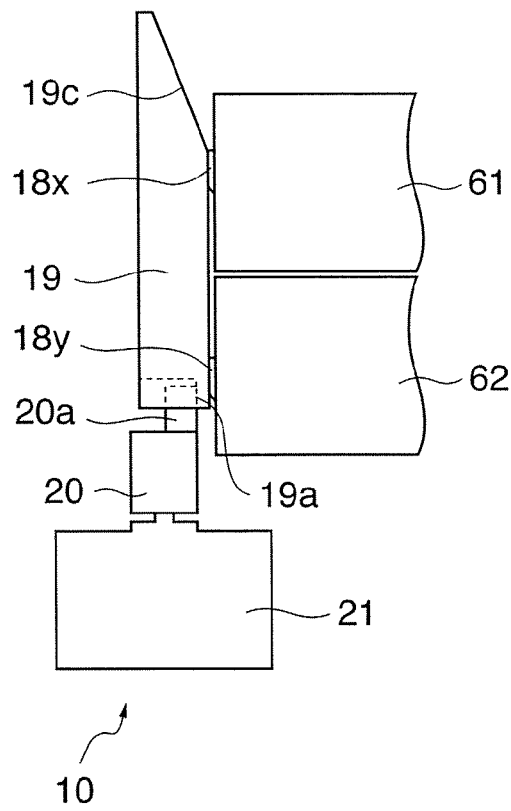
Figure 6B:
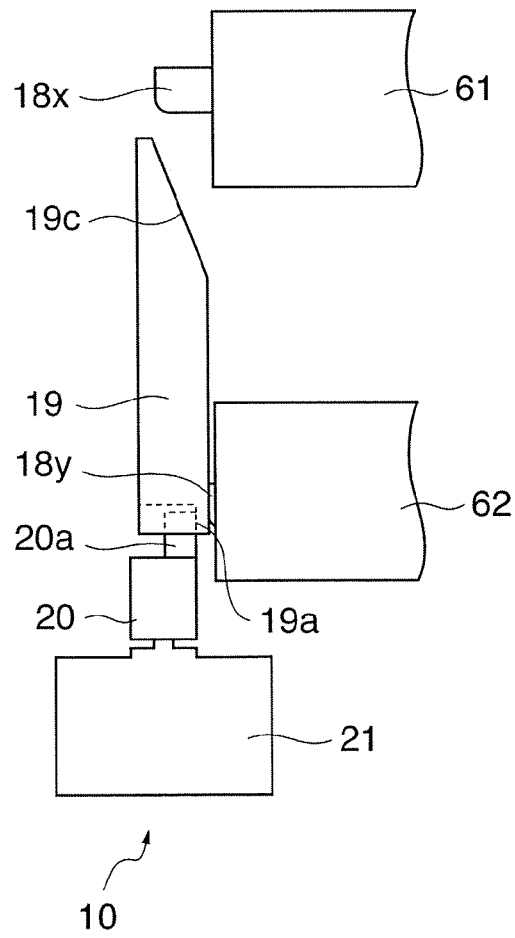

FIGS. 6A and 6B are views of the driving unit 10 and component parts associated therewith, as viewed in the original conveying direction, in which FIG. 6A shows a state in which the apparatus 1 is closed during the reference member reading period, and FIG. 6B shows a state in which the apparatus 1 is opened during the reference member reading period. The state in which the apparatus 1 is closed is defined as a state in which the upper frame 81 and the lower frame 82 are held in meeting contact with each other as shown in FIG. 1 and the original conveying passage can normally function. On the other hand, the state in which the apparatus 1 is opened is defined as a state in which the upper frame 81 is in a lifted position by being turned upward around the pivot shaft 81a, whereby the original conveying passage is kept open for cleaning.

As shown in FIGS. 6A and 6B, the pushing member 19 has a sloping surface part 19c formed on a contact portion thereof facing toward the image reading units 61 and 62, and for contact with the protruding portion 18x. When the apparatus 1 is opened during the reference member reading period, since the slide cam 18 is under tension by the tension spring 22, the protruding portion 18x pressed in by the pushing member 19 protrudes from the image reading unit 61 in a state freed from the pressing force of the pushing member 19. When the apparatus 1 is closed in this state, there is a fear that the protruding portion 18x and the pushing member 19 collides with each other, causing breakage, unless the sloping surface part 19c is formed on the pushing member 19.

However, according to the present embodiment, since the pushing member 19 is formed with the sloping surface part 19c, the protruding portion 18x protruding from the image reading unit 61 is pressed in by being brought into abutment with the sloping surface part 19c during the process of closing the apparatus 1, which makes it possible to prevent breakage due to collision between the protruding portion 18x and the pushing member 19. It should be noted that by forming the end of the protruding portion 18x for contact with the sloping surface part 19c to have a round shape (angle R), it is possible to further enhance the effect of preventing breakage due to collision between the protruding portion 18x and the pushing member 19.

With this arrangement, the image reading apparatus 1 can drive the slide cams 18 of the respective two image reading units 61 and 62 by the single driving unit 10. This eliminates the need for providing each of the two image reading units 61 and 62 with a motor for driving the associated image reading unit and a driving force-transmitting mechanism associated with the motor. As a consequence, a space required for arranging the motor and the driving force-transmitting mechanism can be reduced to thereby achieve reduction of the size of the apparatus 1. Further, it is possible to make the number of component parts of the apparatus 1 smaller than that of the conventional apparatus, thereby reducing the price of the apparatus 1.

Furthermore, the slide cams 18 can be externally driven from the outside of the respective image reading units 61 and 62 to thereby shift the position of the associated line image sensor 11, so that in a case where the image reading apparatus is a single-sided reading apparatus, it is possible to form the apparatus 1 by the upper frame 81 accommodating an image reading unit and the lower frame 82 without an image reading unit, and provide the driving unit 10 in the lower frame 82. Thus, the degree of freedom in configuration of the apparatus 1 can be enhanced.

Next, an operation for detecting an operation starting position of the pulse motor 21 will be described with reference to FIG. 7.

Figure 7:
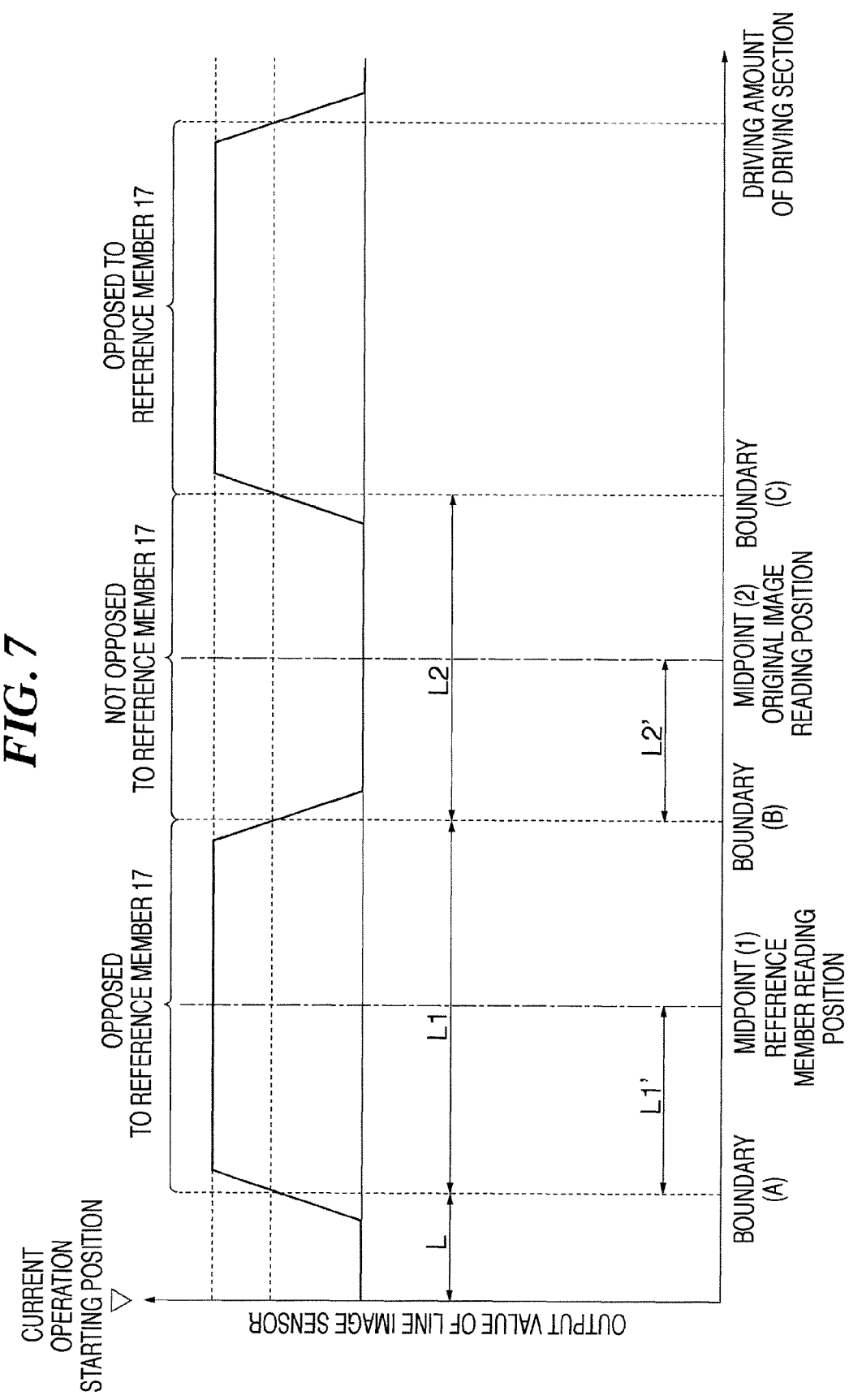
FIG. 7 is a diagram showing an output waveform obtained when an image reading operation is performed by a line image sensor while a pulse motor is rotated at a constant speed.

FIG. 7 is a diagram showing an output waveform obtained when an image reading operation is performed by the line image sensor 11 while the pulse motor 21 is rotated at a constant speed. Specifically, the diagram shows changes in the output value which are common to light-receiving elements of the line image sensor 11 with respect to the number of steps of the pulse motor 21 (driving amount of the driving unit 10) counted when an image reading operation is performed by the line image sensor 11 while rotating the pulse motor 21 at a constant speed.

As the pulse motor 21 is caused to perform one rotation, the line image sensor 11 moves from the position not opposed to the reference member 17 as shown in FIG. 3A to the position opposed to the reference member 17 as shown in FIG. 4A, and then returns to the position not opposed to the reference member 17 as shown in FIG. 3A. In the meantime, a reading operation is performed by the line image sensor 11, and the line image sensor output value as shown in FIG. 7 is stored in the image memory 102. The line image sensor output value is obtained by converting the line image sensor output as an analog signal into digital data by the A/D converter section 100 and then subjecting the digital data to offset correction.

The CPU 104 performs processing for detecting a boundary between image data obtained by reading the reference member 17 in the position opposed to the reference member 17 and image data read in the position not opposed to the reference member 17, from the image data stored in the image memory 102. The CPU 104 stores information on which pulse of the pulse motor 21 corresponds to the detected boundary, and calculates a desirable stop position, whereby it is possible to know the number of steps of the pulse motor 21 required for moving the line image sensor 11 from the current operation starting position to the original image reading position or the reference member reading position. This step count is equal to the driving amount of the driving unit 10.

A midpoint (1) between a boundary (A) detected when the line image sensor 11 has moved from a position not opposed to the reference member 17 as shown in FIG. 3A to a position opposed to the reference member 17 as shown in FIG. 4A and a boundary (B) detected when the line image sensor 11 has moved from the position opposed to the reference member 17 to a position which ceases to be opposed to the reference member 17 as shown in FIG. 3A can be regarded as an optimum position for causing the line image sensor 11 to be opposed to the reference member 17.

On the other hand, a midpoint (2) between the boundary (B) detected when the line image sensor 11 has moved from the position opposed to the reference member 17 as shown in FIG. 4A to the position not opposed to the reference member 17 as shown in FIG. 3A and a boundary (C) detected when the line image sensor 11 has moved from the position not opposed to the reference member 17 to the position opposed to the reference member 17 as shown in FIG. 4A can be regarded as an optimum position for causing the line image sensor 11 to be not opposed to the reference member 17.

However, the size of the reference member 17 varies with each image reading apparatus 1. Further, since the reading position of the line image sensor 11 is moved by the pulse motor 21 via the pushing member 19 and the slide cam 18, the distance of travel of the line image sensor 11 varies.

To detect the optimum positions, the reading operation is performed while rotating the pulse motor 21 at a constant speed, and driving amounts L1 and L2 of the pulse motor 21 required for moving the line image sensor 11 between the boundaries are each determined as respective step counts based on the changes in the output value shown in FIG. 7. Thus, driving amounts L+L1' and L+L1+L2' of the pulse motor 21 required for moving the line image sensor 11 from the current operation starting position of the pulse motor 21 to the positions corresponding to the respective midpoints (1) and (2) can be each determined as respective step counts.

As described above, it is possible to calculate the driving amount for moving the line image sensor 11 to the midpoint (1) as a driving amount for positioning the line image sensor 11 for the reference member reading operation and the driving amount for moving the line image sensor 11 to the midpoint (2) as a driving amount for positioning the line image sensor 11 for the original image reading operation, respectively. This eliminates the need for additionally providing a position sensor for detecting the operation starting position of the line image sensor 11.

Even when the line image sensor 11 is moved to the position not opposed to the reference member 17, if an original D or the like exists on the contact glass 15, the difference in brightness between the surface of the original D and that of the reference member 17 becomes so small that the boundaries cannot be detected. Therefore, in this case, an error message may be displayed to instruct or urge a user to remove the original D.

By the way, immediately after the power of the image reading apparatus 1 is turned on, it is impossible to recognize the current stop position of the pulse motor 21. This means that the position of the line image sensor 11 cannot be determined. For this reason, neither the light amount adjustment of the light source nor the gain adjustment of the A/D converter section 100 can be performed at this time point.

Therefore, in the operation for searching for the boundaries of reference member 17, a light amount set value of the light source, a gain set value of the A/D converter section 100, and the shading correction data are each set to a preset initial value (particularly suitable after assembling the apparatus 1 in a factory, for example). In discriminating between a scan image read at "the optimum position for causing the line image sensor 11 to be opposed to the reference member 17 (the midpoint (1))" as mentioned above (hereinafter referred to as "the scan image from the reference member 17") and a scan image read at "the other optimum position for causing the line image sensor 11 to be not opposed to the reference member 17 (the midpoint (2))" as mentioned above (hereinafter referred to as "the scan image from the portion other than reference member 17"), a method of utilizing the difference in magnitude between an output from the line image sensor 11 and a predetermined threshold value can be exemplified as an easy method to employ.

However, the influence of variation in the amount of light from the light source or the like can make it impossible to discriminate between the scan image from the reference member 17 and that from the portion other than the reference member 17 using the preset initial values or the predetermined threshold value. In such a case, it is possible to employ a method of storing the maximum and minimum values of the output from the line image sensor 11 during one rotation of the pulse motor 21, and setting the average value of the maximum and minimum values to the threshold value, or a method of changing the light amount set value of the light source and the gain set value of the A/D converter section 100 such that discrimination between the scan image from the reference member 17 and that from the portion other than the reference member 17 can be performed based on a predetermined threshold value. The gain set value may be changed by adjusting an amplifier that amplifies an analog signal before A/D conversion, or by computing digital data after A/D conversion.

With the above-described arrangement, during the reference member reading period before execution of the image reading operation, the image reading apparatus 1 rotates the pulse motor 21 to bring the pushing member 19 and the slide cam 18 into the state shown in FIG. 5B, thereby moving the line image sensor 11 to the position opposed to the reference member 17 (see FIG. 4A). Then, when the line image sensor 11 and the reference member 17 are opposed to each other such that the reading effective range of the line image sensor 11 is covered by the reference member 17, the line image sensor 11 reads the reference member 17. As a consequence, correction data generated based on the output from the line image sensor 11 is stored on a pixel-by-pixel basis, as shading correction data for use in shading correction. Thereafter, the image reading apparatus 1 rotates the pulse motor 21 to bring the pushing member 19 and the slide cam 18 into the state shown in FIG. 5A, thereby moving the line image sensor 11 to the position not opposed to the reference member 17 (see FIG. 3A).

According to the above-described embodiment, the image reading unit 61 (62) has the glass holding member 16 for holding the contact glass 15, the line image sensor 11 for reading an image on each conveyed original D, the reference member 17 disposed at a location different from the reading location on the contact glass 15, and the moving mechanism for relatively moving the line image sensor 11 and the reference member 17 so as to enable the original D and the reference member 17 to be read alternatively. With this arrangement, the driving unit 10 drives the moving mechanism from the outside of the image reading unit 61 to move at least one of the line image sensor 11 and the reference member 17. This makes it possible to form the moving mechanism (the slide cam 18, the tension spring 22, etc.) for moving the line image sensor 11 between the original image reading position and the reference member reading position, and the driving unit 10 for driving the moving mechanism, using a smaller number of component parts than in the conventional image reading apparatus. Further, even though the reference member 17 is disposed on the original conveying path, the white reference surface of the reference member 17 held in intimate contact with the contact glass 15 can be read by the line image sensor 11 for acquisition of shading correction data, so that accurate shading correction can be performed without cleaning.

Figure 8A:
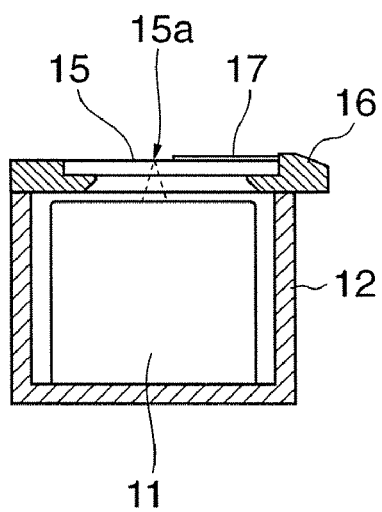
Figure 8B:
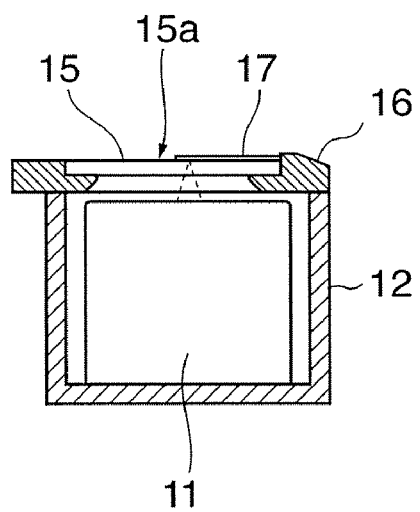
Figure 9A:
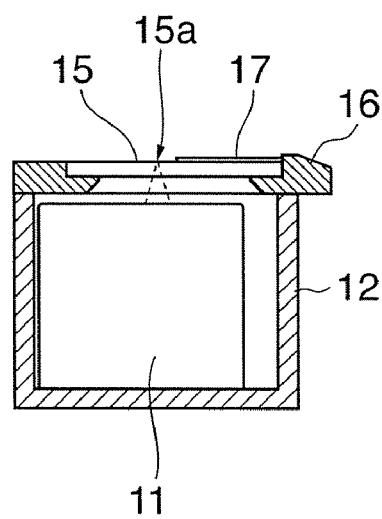
Figure 9B:
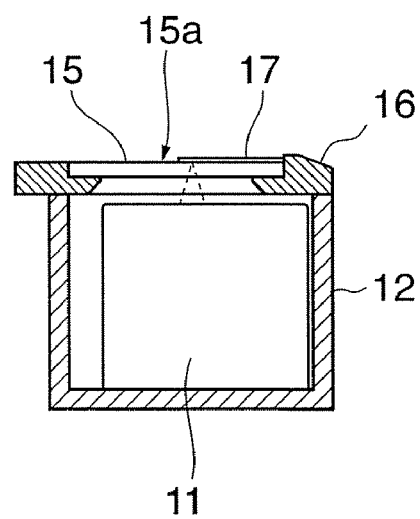

Although in the above-described embodiment, only the line image sensor 11 is moved, this is not limitative. More specifically, the line image sensor 11 and the glass holding member 16 may be relatively moved to thereby shift the line image sensor 11 between the position opposed to the reference member 17 and the position not opposed to the reference member 17. For example, the image reading unit may be configured such that only the glass holding member 16 is moved during a transition period between the original reading period shown in FIG. 8A and the reference member reading period shown in FIG. 8B, or alternatively such that the line image sensor 11 and the glass holding member 16 are both moved during the transition period between the original reading period shown in FIG. 9A and the reference member reading period shown in FIG. 9B.

Figure 10A:
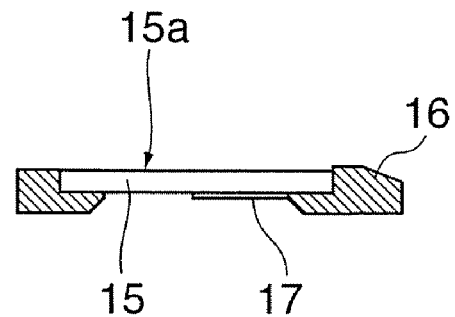
Figure 10B:
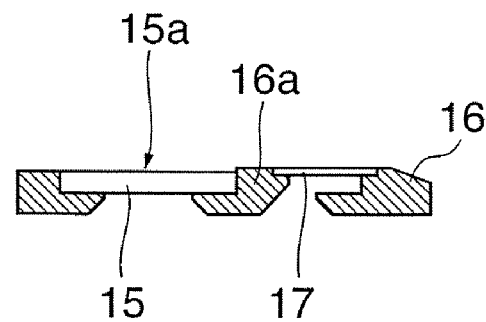
Figure 10C:
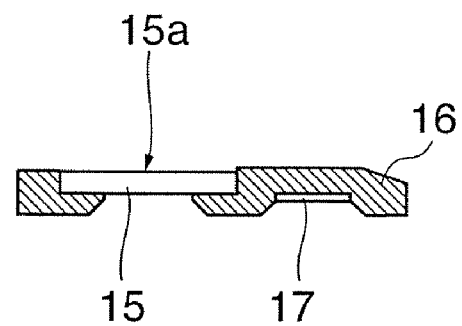

Further, although in the above-described embodiment, the reference member 17 is provided on the original conveying surface of the contact glass 15, this is not limitative. More specifically, the reference member 17 can be disposed at any location on the contact glass 15 or on the glass holding member 16 insofar as it is off the original image reading location 15a. For example, as shown in FIG. 10A, the reference member 17 may be disposed on the opposite side of the contact glass 15 from the original conveying surface thereof. Alternatively, the reference member 17 may be disposed on the original conveying surface of the glass holding member 16 as shown in FIG. 10B, or on the opposite side of the glass holding member 16 from the original conveying surface of the same as shown in FIG. 10C. In the case shown in FIG. 10B, the line image sensor 11 has to move over a junction part 16a connecting between the contact glass 15 and the reference member 17, which increases the distance of travel of the line image sensor 11. Therefore, the junction part 16a may be omitted as shown in FIG. 10D.

Figure 10D:
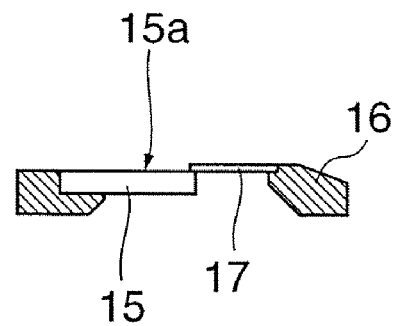

The reference member 17 disposed as shown in FIGS. 10B and 10D requires sufficient strength and thickness for preventing the white reference surface thereof from being damaged by conveyed originals D. In the cases shown in FIGS. 10A and 10C, the white reference surface of the reference member 17 and the upper surface of the contact glass 15 as the surface for reading originals D are different in position from each other, and hence it is desirable to select a thickness of the contact glass 15 and a shape of the glass holding member 16 such that the surfaces of the two are both brought into focus. This is because one of unevenesses which must be corrected by shading correction is variation in the amount of light from a rod lens array (not shown), but the profile of the variation in the light amount (i.e. light amount distribution profile) becomes different in a position away from a position in focus, which makes the shading correction inaccurate. When the variation in the performance of the rod lens array is small, the reference member reading operation can be performed in a position out of focus.

In the cases in FIGS. 10A and 10D as well, insofar as the line image sensor 11 can be eventually moved between the position opposed to the reference member 17 and the position not opposed to the reference member 17, it doesn't matter whether the line image sensor 11, the reference member 17, the glass holding member 16 or the like moves in the vertical direction or any other direction, or even perform rotation in the course of travel. Further, in the cases in FIGS. 10A and 10D, the white reference surface of the reference member 17 is exposed to the inner side of the image reading unit 61 (62), and therefore there is no fear of the white reference surface being damaged or paper powder or dust being deposited on the white reference surface.

Although in the above-described embodiment, the sloping surface part 19c is formed on the pushing member 19 so as to prevent the protruding portion 18x of the slide cam 18 from being broken when the apparatus 1 is opened during the reference member reading period, this is not limitative, but in another embodiment, the image reading apparatus may be configured such that when the apparatus 1 is opened/closed during the reference member reading period, the opening/closing of the apparatus 1 is detected, and the pulse motor 21 is caused to rotate to bring the pushing member 19 into the state shown in FIG. 5A, thereby preventing breakage of the protruding portion 18x.

Detect means for detecting the opening/closing of the apparatus 1 may be implemented by any type of detector, including a microswitch, a photo-detector switch, and a magnetic detector switch. Alternatively, determination as to the opening/closing of the apparatus 1 may be performed by detecting that the read output from the line image sensor 11 has assumed a value quite different from one in the normal state. It is also possible to use a control means implemented e.g. by the CPU or a combination of the control means and a special-purpose electric circuit as a detect means for detecting the opening/closing of the apparatus 1.

Further, although in the above-described embodiment, the image reading apparatus is capable of double-sided reading of an original D, it is to be understood that the present invention can be applied to an image reading apparatus for single-sided reading.

Furthermore, even when variation in the size of the reference member 17, or variation in the distance of travel performed by the line image sensor 11 when the pulse motor 21 moves the reading position of the line image sensor 11 via the pushing member 19 and the slide cam 18 occurs as differences between individual units of the image reading apparatus 1, the CPU 104 performs control, as described below with reference to FIG. 11, such that a sensor output value is read whenever the driving amount (step count) of the driving unit 10 is increased by one or several steps. This makes it possible to accurately determine a shading correction data acquisition position (i.e. a reference member reading position).

Figure 11:
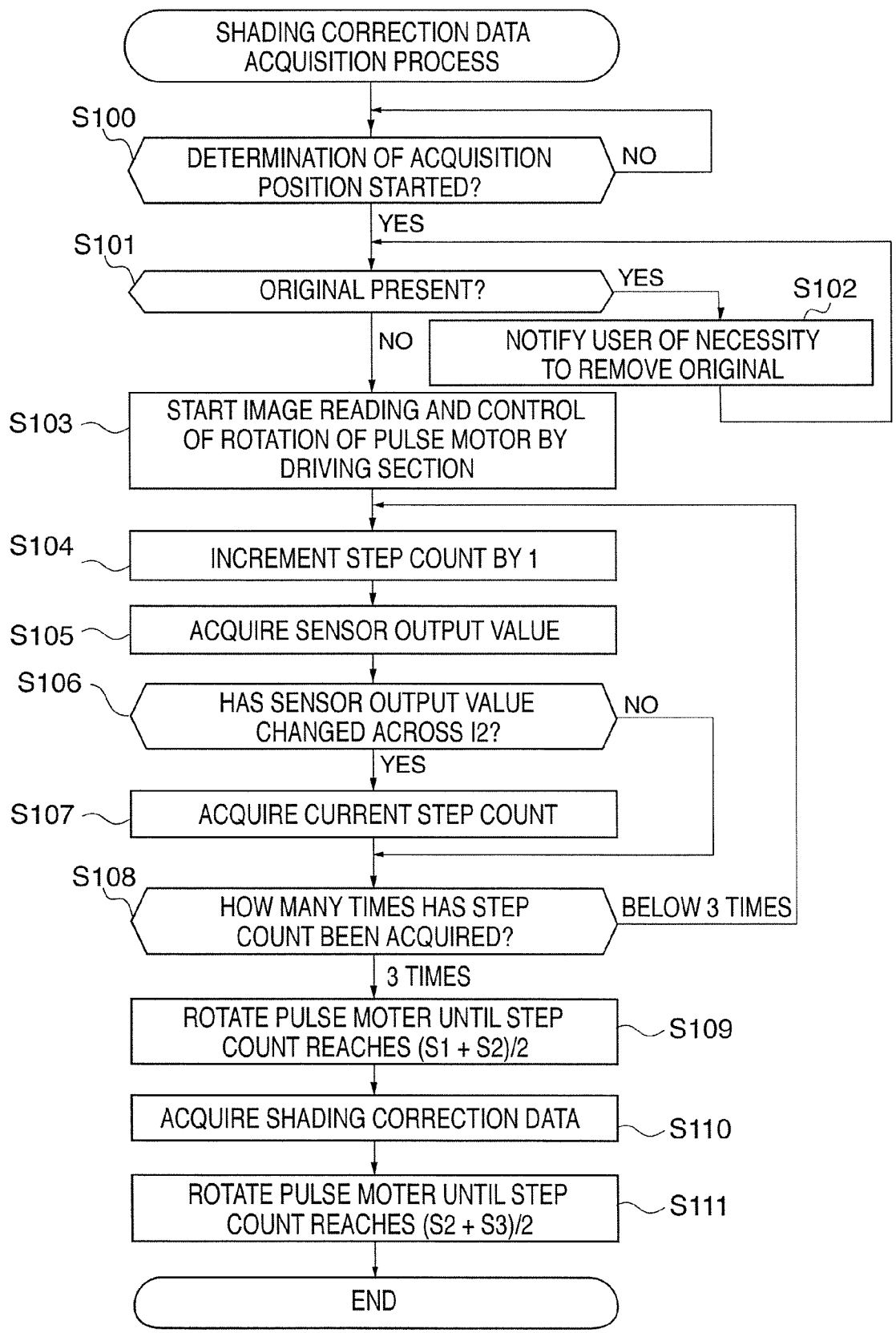
FIG. 11 is a flowchart of a shading correction data acquisition process executed by a CPU.

FIG. 11 is a flowchart of a shading correction data acquisition process executed by the CPU 104.

In this process, when the line image sensor 11 is standing still, it is assumed that the reading position of the line image sensor 11 is on the above-described boundary or in an area other than the area where the reference member 17 is disposed, unless otherwise specified.

Referring to FIG. 11, first, it is determined whether or not determination of a position for acquiring an image and a position for acquiring shading correction data is to be started (step S100). If it is determined that the determination is to be started, the process proceeds to a step S101, whereas if not, the apparatus 1 is kept on standby for execution of the determination process, i.e. the following steps. In the step S100, it may be determined that the determination process is started when a predetermined input is received from the user, or when a predetermined time period has elapsed after the start of the apparatus 1.

Next, it is determined whether or not an original D is present on the contact glass 15 (step S101). If an original D is present, a message to the effect that the original D has to be removed is notified to the user (step S102), followed by the steps S101 et seq. being executed. In the step S101, the pulse motor 21 is driven for one rotation or a predetermined number of rotations to cause the line image sensor 11 to perform an image reading operation, and if the difference in brightness between the area where the line image sensor 11 opposed to the reference member 17 and the other area is too small to detect the boundary even after the reading position has moved between the two area, it is determined that an original D is present on the contact glass 15. It should be noted that the determination may be performed using an original detecting sensor for detecting passage of an original D.

On the other hand, if it is determined in the step S101 that there is no original present on the contact glass 15, the image reading operation by the line image sensor 11 is restarted, and at the same time the driving unit 10 starts controlling the pulse motor 21 to cause the pulse motor 21 to rotate at a constant speed (step S103).

Thereafter, the driving amount (step count) of the pulse motor 21 is incremented by one (step S104), a sensor output value from the line image sensor 11 is acquired (step S105), and then it is determined whether or not the acquired sensor output value has changed across a threshold value $I_2$ (step S106).

If it is determined in the step S106 that the sensor output value has not changed across the threshold value $I_2$, the process immediately proceeds to a step S108, whereas if the sensor output value has changed across the threshold value $I_2$, the process proceeds to the step S108 after acquiring the current step count of the pulse motor 21 (step S107).

Thereafter, the number of times of acquisition of the step count in the step S107 is counted (step S108). If it is determined in the step S108 that the number of times of acquisition of the step count is below three times, the steps S104 et seq. are executed. Hereafter, for simplicity of explanation, the values of the step count will be designated by reference numerals S1, S2, and S3, respectively, in the order of acquisition. The value S1 corresponds to the driving amount L in FIG. 7, the value S2 to a driving amount L+L1, and the value S3 to a driving amount L+L1+L2.

On the other hand, if it is determined in the step S108 that the number of times of acquisition is three times, the pulse motor 21 is rotated in the reverse direction until the step count reaches (S1+S2)/2 (L+L1' in FIG. 7: midpoint (1)) (step S109), whereby an image of the reference member 17 at the current reading position of the line image sensor 11 is read on a pixel-by-pixel basis by the line image sensor 11, and image data based on the read image is acquired as shading correction data (step S110). It should be noted that step count is decremented while the pulse motor 21 is rotated in the reverse direction. Thereafter, the pulse motor 21 is rotated in the normal direction until the step count reaches (S2+S3)/2 (L+L1+L2' in FIG. 7: midpoint (2)), and the image reading position is finally determined (step S111), followed by terminating the present process.

This completes the preparation for performing an original image reading operation in the optimum reading position of the line image sensor 11 in the subsequent process and the acquisition of optimum shading correction data.

Thereafter, whenever an original reading instruction is received, only an original D is moved without shifting the reading position, whereby an image in the current reading position is read on a pixel-by-pixel basis by the line image sensor 11 to acquire each pixel of the image as an original image element. Then, shading correction is performed on each of the acquired original image elements based on the shading correction data acquired in the step S110.

According to the process shown in FIG. 11, the CPU 104 acquires the sensor output value from the line image sensor 11 while controlling the driving of the driving unit 10 such that the reading position of the line image sensor 11 is reciprocated along the contact glass 15 (steps S103 to S105), and detects the driving amounts S1, S2, and S3 each of which is acquired during a time period from the start of the driving to a time point when the sensor output value changes across the threshold value $I_2$ (step S108). Then, the pulse motor 21 is rotated in the reverse direction by the step count of (S1+S2)/2, and image data read on a pixel-by-pixel basis by the line image sensor 11 in the current reading position is set as shading correction data. Further, the pulse motor 21 is rotated in the normal direction in advance by a step count of (S2+S3)/2, in preparation for the original image reading operation. This makes it possible to perform a reliable original image reading operation in a reading position corresponding to the step count. Further, the positioning of the original image reading position and the reference member reading position can be achieved without using a position sensor or forming a position detection mark on the reference member, so as to determine whether or not the line image sensor 11 is positioned at the midpoint (1) or (2) in FIG. 7, which makes it possible to attain size and price reduction and high-accuracy image reading at the same time.

It should be noted that immediately after the start of the image reading apparatus 1, it is impossible to recognize the current rotational angle of the pulse motor 21. This means that the position of the line image sensor 11 cannot be determined. For this reason, at this time point, neither light amount adjustment of the light source nor gain adjustment of the A/D converter section 100 can be performed. Therefore, the above-described boundary detecting operation is performed e.g. subsequently after assembling the apparatus 1 in a factory, in a state in which the light amount set value of the light source, the gain set value of the A/D converter section 100, and the shading correction data are each set to a preset initial values.

Although in the present embodiment, the boundaries are detected when the sensor output value changes across the threshold value $I_2$, the influence of variation in the amount of light from the light source or the like sometimes makes it impossible to discriminate between the scan image from the reference member 17 and that from the portion other than the reference member 17 using the preset initial values.

In such a case, it is desirable to store the maximum and minimum values of the output from the line image sensor 11 during one rotation or a predetermined number of rotations of the pulse motor 21 and use the average value of the maximum value and the minimum value in place of the above-mentioned preset initial values. Alternatively, it is also possible to employ a method of changing the light amount set value of the light source and the gain set value of the A/D converter section 100 such that discrimination between the scan image from the reference member 17 and that from the portion other than the reference member 17 can be performed based on a predetermined threshold value. The gain set value may be changed by adjusting the amplifier that amplifies an analog signal before A/D conversion, or by computing digital data after A/D conversion.

The CPU 104 may be used as a special control means for carrying out the process from detection of the boundaries to determination of the original image reading position, or a control means which is also capable of controlling other parts of the image reading apparatus 1.

Further, hardware formed by combining a counter, a comparator, etc. may be used to control a part or all of the process executed by the control means.

Figure 12A:
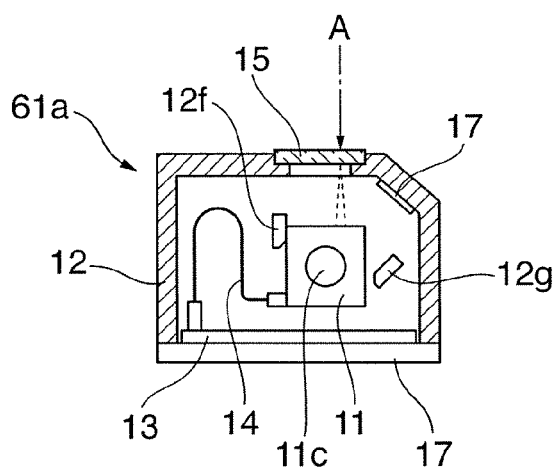
Figure 12B:
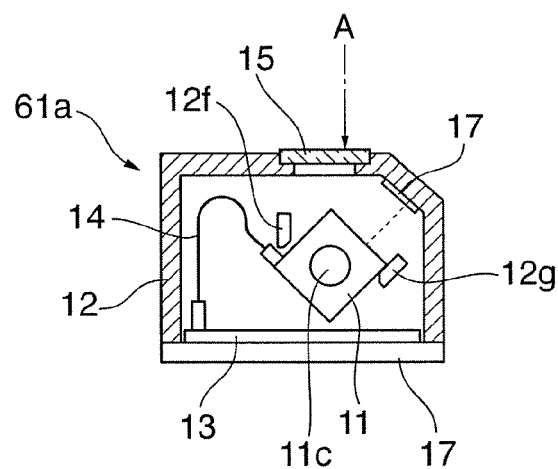
Figure 13:
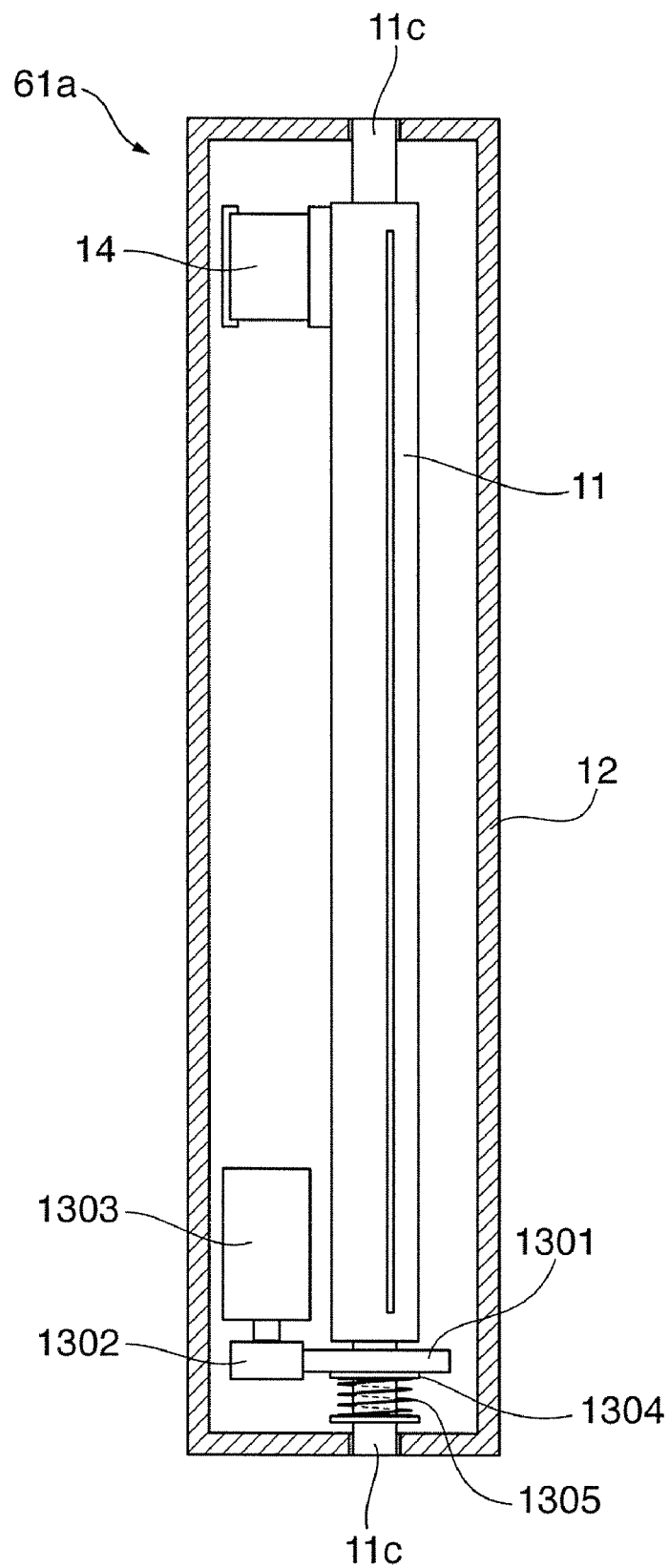
FIG. 13 is a transverse cross-sectional view of the image reading unit shown in FIGS. 12A and 12B.

FIGS. 12A and 12B and FIG. 13 are cross-sectional views showing a variation of the image reading unit 61. In the following, a description will be given of only the variation of the image reading unit 61, but it is to be understood that this variation can also be applied to the image reading unit 62.

As shown in FIGS. 12A and 12B and FIG. 13, an image reading unit 61a includes a frame 12 which has an opening formed in an upper surface thereof facing the lower surface of an original D, and pivotally supports a support shaft 11c of the line image sensor 11 accommodated therein. The line image sensor 11 is provided with an LED which form an illuminating means and a SELFOC lens array.

Further, the image reading unit 61a includes a printed circuit board 13 for operating the line image sensor 11, a flat cable 14 for connecting between the line image sensor 11 and the printed circuit board 13, and a contact glass 15 fitted in the opening of the frame 12 and held thereat, for guiding an original D in an original image reading location A, and the reference member 17 fixed to the inside of the frame 12, for serving as the white reference surface. Furthermore, the image reading unit 61a has a gear 1301 connected to the support shaft 11c via a friction mechanism, a driving gear 1302 in mesh with the gear 1301 for driving the same, and a small-sized motor 1303, which are arranged within the frame 12.

With this arrangement, when the small-sized motor 1303 is rotated in the normal direction with the reading position of the line image sensor 11 being a position (original image reading location A) shown in FIG. 12A, the gear 1301 is rotated. This rotation of the gear 1301 is transmitted to the support shaft 11c of the line image sensor 11 via a friction plate 1304 and a pressure spring 1305, which form the friction mechanism, to thereby rotate the line image sensor 11. Then, when the reading position is rotated about the support shaft 11c to a position (shading correction data acquisition position) shown in FIG. 12B, the rotation of the line image sensor 11 is stopped.

The line image sensor 11 photoelectrically converts reflected light received from the reference member 17 when in the shading correction data acquisition position. And image processing section 101 stores data obtained based on a sensor output signal (read signal) generated by the photoelectric conversion, as shading correction data on a pixel-by-pixel basis.

When the small-sized motor 1303 is rotated in the reverse direction after acquisition of the shading correction data, the line image sensor 11 rotates in the reverse direction in accordance with the reverse rotation of the small-sized motor 1303 until the reading position returns to the original image reading location A.

The line image sensor 11 receives reflected light from each of originals D sequentially conveyed to the original image reading location A, through the contact glass 15, and photoelectrically converts the received reflected light. Then, image processing section 101 stores a image data obtained from sensor output signal generated by the photoelectric conversion of the received reflected light, as original image data on a pixel-by-pixel basis.

The frame 12 has stoppers 12f and 12g formed therein for restricting rotation of the line image sensor 11 such that the reading position is reciprocated between the original image reading location A and the shading correction data acquisition position. These stoppers 12f and 12g cooperate with the friction plate 1304 to reliably stop the reading position of the line image sensor 11 at the original image reading location A and the shading correction data acquisition position, respectively, without necessitating high-accuracy control of the amount of rotation of the small-sized motor 1303.

The line image sensor 11 is disposed such that a distance therefrom to the reference member 17 when it is in the shading correction data acquisition position becomes equal to an optical distance therefrom to the surface of an original D when it is in the original image reading location A (which is corrected in view of the glass thickness of the contact glass 15 disposed between the line image sensor 11 and the original D). This is to equalize the reading conditions of the line image sensor 11, i.e. the focal position of the rod lens array, between the original image reading position and the shading correction data acquisition position.

Alternatively, the difference in the amount of reflected light due to the difference in the optical distance may be corrected, instead of disposing the line image sensor 11 such that the optical distance is equalized as described above. Reading of the reference member 17 can be performed even in a position out of focus, and therefore it is assumed that the reading position includes positions deviated from the position in focus.

According to the above-described variation, the small-sized motor 1303 is provided within the frame 12, so that the image reading unit 61a can be positively hermetically closed.

If the image reading unit 61a is constructed such that the support shaft 11c thereof is not exposed from the frame 12, the image reading unit 61a can be more hermetically closed.

Figure 14:
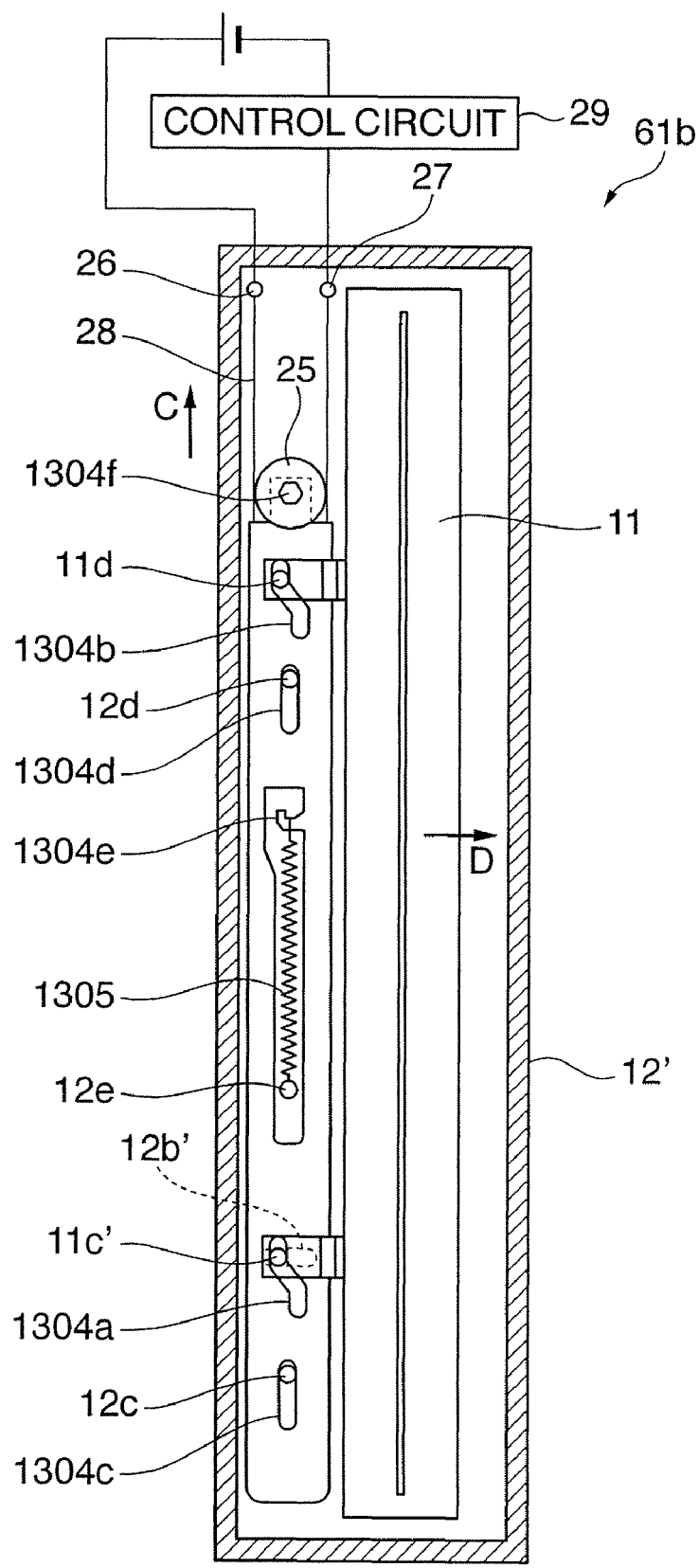
FIG. 14 is a transverse cross-sectional view of another variation of the image reading unit.

FIG. 14 is a transverse cross-sectional view of another variation of the image reading unit.

In the above-described variation, the image reading unit 61a uses a solenoid as a driving means for moving the slide cam 1304 connected to the line image sensor 11. On the other hand, the image reading unit 61b according to the present variation uses a Biometal® 28 which is a kind of shape-memory alloy, as the driving means. The image reading unit 61a and the image reading unit 61b are basically identical in construction except that the driving means are different, and hence duplicate description thereof is omitted, with the same reference numerals designating the same components.

Referring to FIG. 14, the image reading unit 61b has a driving means thereof implemented by a metal-based fiber actuator provided with the biometal 28. When the fiber actuator is energized, its entire length is reduced by approximately 5%, and when the energization is stopped, the fiber actuator recovers its original length. This enables the driving means to have excellent responsivity, be easily shrunk with a low voltage, and generate a relatively large driving force.

Further, the image reading unit 61b has a slide cam 1304 having one end thereof integrally formed with a shaft 1304f, with a pulley 25 being rotatably supported on the shaft 1304f. The frame 12' of the image reading unit 61b has terminals 26 and 27 disposed therein. The biometal 28 is wound around the pulley 25, and the opposite ends of the biometal 28 are fixed to the respective terminals 26 and 27.

In the image reading unit 61b constructed as above, when a voltage is applied from an external control circuit 29 to the terminals 26 and 27 within the image reading unit 61b, with the reading position of the line image sensor 11 being the original image reading location A (not shown), the biometal 28 shrinks. As a consequence, the slide cam 1304 is pulled in a direction indicated by an arrow C via the pulley 25. Movement of the slide cam 1304 by the pulling causes the line image sensor 11 to move in a direction indicated by an arrow D. Thereafter, when the reading position is shifted to the shading correction data acquisition position, the movement of the line image sensor 11 is stopped.

The line image sensor 11 photoelectrically converts reflected light received from the reference member 17 when in the shading correction data acquisition position. And image processing section 101 stores correction data formed based on a sensor output having been subjected to the photoelectric conversion, as shading correction data on a pixel-by-pixel basis.

After acquisition of the shading correction data, when the control circuit 29 is deenergized, the biometal 28 extends to its original length. As a consequence, the slide cam 1304 is pulled back by a tension spring 1305, whereby the reading position returns to the original image reading location A.

In the present variation, a tensile force generated when the biometal 28 is shrunk is amplified by employing the construction in which the biometal 28 is wound around the pulley 25. However, in a case where the biometal 28 itself generates a sufficient tensile force, the biometal 28 may be directly connected to the slide cam 1304 without using the pulley 25.

Further, although in the present embodiment, only the line image sensor 11 is moved when performing the shading correction, only the reference member 17 or both the line image sensor 11 and the reference member 17 may be moved.

Furthermore, the driving means for moving the line image sensor 11 or the reference member 17 may be implemented differently than in the above-described embodiment and variation. For example, an actuator, such as a piezoelectric element or a magnetostrictive element, may be used.

Figure 15:
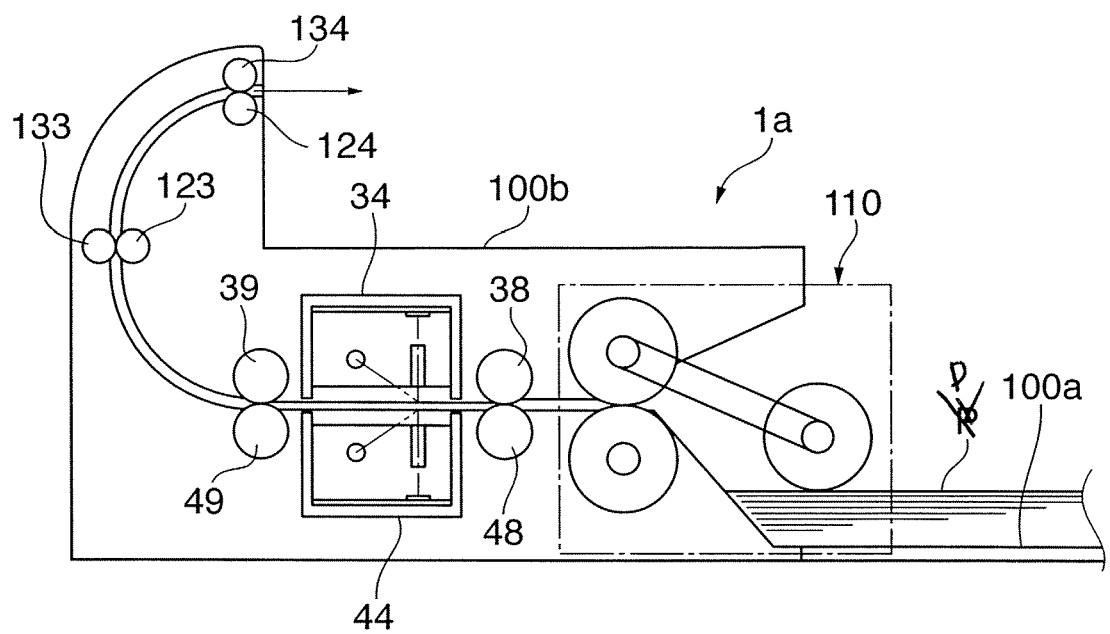
FIG. 15 is a schematic transverse cross-sectional view of an image reading apparatus according to a second embodiment of the present invention.

FIG. 15 is a schematic transverse cross-sectional view of an image reading apparatus according to another embodiment of the present invention.

As shown in FIG. 15, the image reading apparatus 1a is comprised of an original loading section 100a that accommodates a stack of originals D thereon, a discharged sheet stacking section 100b that receives and stacks originals D having undergone image reading, and a sheet feeding/conveying device 110 that separates the stacked originals D, one by one, and conveys each of originals D into the apparatus 1a. Further, the image reading apparatus 1a includes a registration roller 48 that temporarily stops its rotation and corrects skew of a original D by restricting the position of the leading end of the original D, followed by conveying the same, and conveying rollers 49, 133, and 134 that convey each of the originals D at a predetermined speed. Furthermore, the image reading apparatus 1a includes driven rollers 38, 39, 123, and 124 arranged in a state pressed by the registration roller 48 and the conveying rollers 49, 133, and 134, respectively, and a front-side image reading section 34 and a reverse-side image reading section 44 that read images on the respective upper and lower sides of the conveyed original D.

When an image reading operation is started, the image reading apparatus 1*a* causes the sheet feeding/conveying device 110 to separate a plurality of originals D stacked on the original loading section 100*a*, one by one, and convey each separated original D into the apparatus 1*a*. The separated original D is conveyed by the registration roller 48 and the driven roller 38 to be passed between the front-side image reading section 34 and the reverse-side image reading section 44 substantially in intimate contact with the two sections 34 and 44.

During passage of the original D, the front-side image reading section 34 and the reverse-side image reading section 44 face the respective upper and lower sides of the original D and line-scan the upper and lower images formed on the respective sides of the original D. Image reading is performed by inputting an electric signal generated by each line-scanning to an electric circuit board, not shown, and converting the same into digital image data. After completion of the image reading operation, the original D is discharged onto the discharged sheet stacking section 100*b*.

Figure 16A:
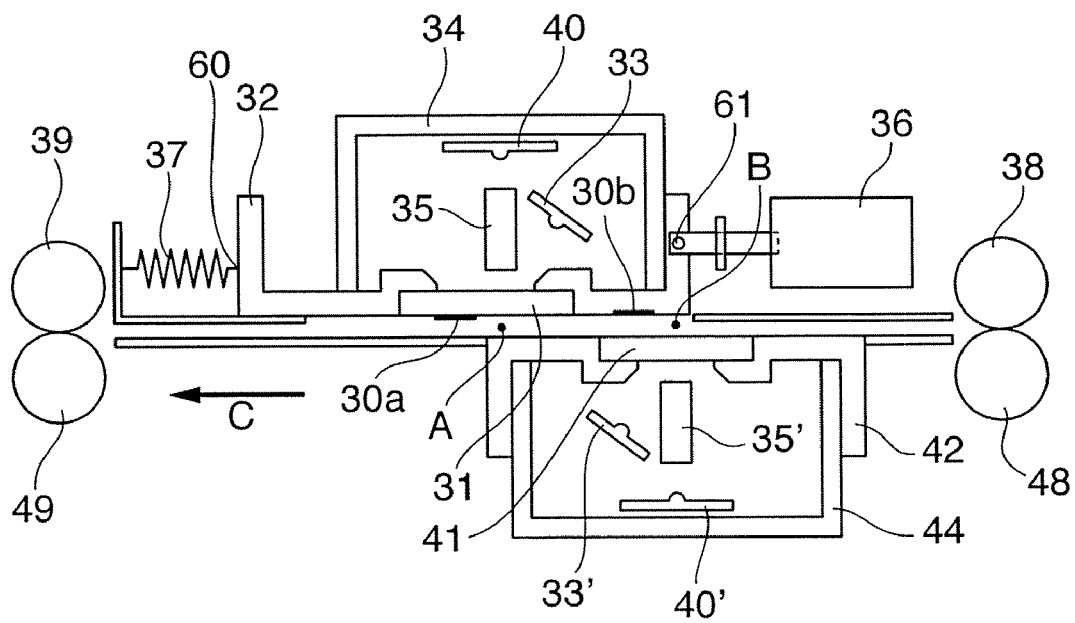
Figure 16B:
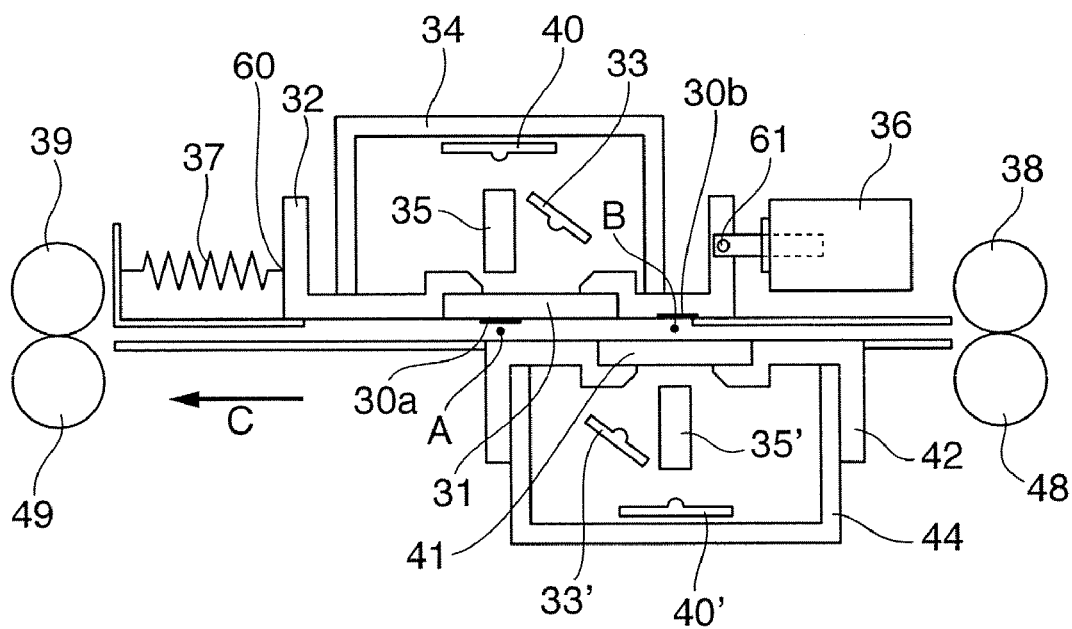

FIGS. 16A and 16B are schematic cross-sectional views of the front-side image reading section 34 and the reverse-side image reading section 44 appearing in FIG. 15, and component parts and elements associated therewith, in which FIG. 16A shows an original reading state or an original reading standby state, and FIG. 16B shows a state during correction data acquisition.

As shown in FIGS. 16A and 16B, the front-side image reading section 34 and the reverse-side image reading section 44 incorporate LEDs 33 and 33' as illuminating means, lens arrays 35 and 35', and image sensors 40 and 40', respectively. Further, they have contact glasses 31 and 41 disposed on respective surfaces thereof facing an original.

The contact glasses 31 and 41 guide the conveyed original D in respective original image reading positions A and B. The contact glasses 31 and 41 are supported by respective glass holding members 32 and 42. The contact glass 41 may be directly connected to the frame of the reverse-side image reading section 44, without providing the glass holding member 42.

The glass holding member 32 is provided with a tension spring 37 and a solenoid 36. This construction enables the glass holding member 32 to move the front-side image reading section 34 in parallel with an original conveying direction, as described hereinafter. Although in the present description, a driving means for moving the front-side image reading section 34 is implemented by the solenoid 36, a different driving means may be employed.

The contact glass 31 has a reference member 30*a* disposed on an original conveying surface side thereof, for use in shading correction data acquisition. Similarly, the glass holding member 32 has a reference member 30*b* disposed on an original conveying surface side thereof, for use in shading correction data acquisition.

It should be noted that the method of disposing the reference member 30*a* (30*b*) is not particularly limited, but a method, such as printing, coating, or sheet pasting, may be employed to dispose the reference member 30*a* (30*b*) on disposition surface of the contact glass 31 (glass holding member 32).

The glass holding member 32 is disposed such that it is constantly pulled by the tension spring 37 in a direction indicated by an arrow C. While the solenoid 36 is kept deenergized, the reference member 30*a* lies off the original image reading location A, and the reference member 30*b* lies off the original image reading location B, as shown in FIG. 16A. When an original is conveyed in between the front-side image reading section 34 and the reverse-side image reading section 44 in this state, and the LEDs 33 and 33' illuminate the original with emitted light, a reflected light from the upper side of the original at the original image reading location A is received by the image sensor 40, and similarly, a reflected light from the lower side of the original at the original image reading location B is received by the image sensor 40'. The received reflected lights are photoelectrically converted by the respective image sensors 40 and 40' and then input to the electric circuit board, not shown, whereby images on the respective sides of the original are read.

On the other hand, when a shading correction data acquiring operation is started, the solenoid 36 is energized, and the glass holding member 32 moves by the amount of attraction by the solenoid 36 in a direction opposite to the direction indicated by the arrow C. When this movement is completed, the reference member 30*a* is brought to the original image reading location A, and the reference member 30*b* is brought to the original image reading location B, as shown in FIG. 16B. Each of the lens arrays 35 and 35' has a certain focus range suitable for original reading, on its optical axis, and hence even positions slightly vertically deviated from the original image reading positions A and B in FIG. 16B are also included in the original image reading position. When light is emitted from each of the LEDs 33 and 33' in this state, a reflected light from the upper surface of the reference member 30*a* in the original image reading location A is received by the image sensor 40, and a reflected light from the lower surface of the reference member 30*b* in the original image reading location B is received by the image sensor 40'. The received reflected lights are photoelectrically converted by the respective image sensors 40 and 40', and shading correction data for each of images on the respective upper and lower sides of the original D is generated and stored on a pixel-by-pixel basis.

Although in the present embodiment, the disposition position of the reference member 30*a* is set on the original conveying surface of the contact glass 31, this is not limitative, but the reference member 30*a* may be set differently insofar as the glass holding member 32 integrally holds both the reference member 30*a* and the reference member 30*b*.

Figure 17A:
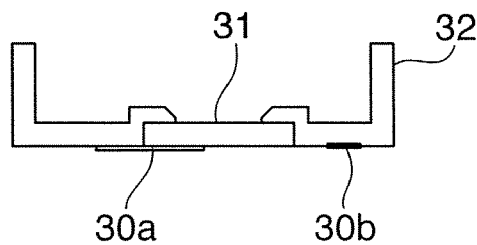
FIGS. 17A to 17H are views schematically showing variations of the layout of reference members appearing in FIGS. 16A and 16B.
Figure 17E:
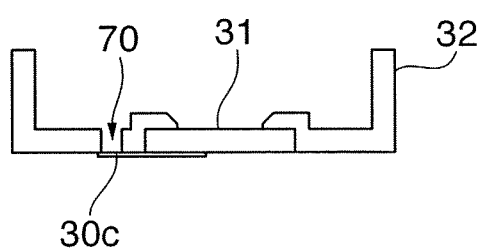
Figure 17B:
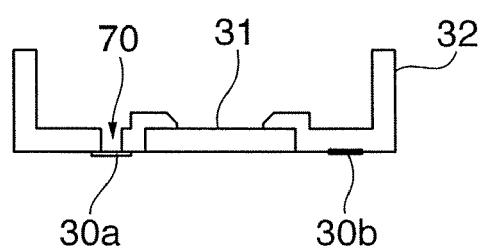

For example, the reference member 30*a* may be disposed on a plane spreading across a boundary between the contact glass 31 and the glass holding member 32, as shown in FIG. 17A, or on the original conveying surface of the glass holding member 32, as shown in FIG. 17B. Further, alternatively, the reference member 30*a* may be disposed on the opposite surface of the glass holding member 32 from the original conveying surface thereof, as shown in FIG. 17C, or on the opposite surface of the contact glass 31 from the original conveying surface thereof, as shown in FIG. 17D.

Figure 17F:
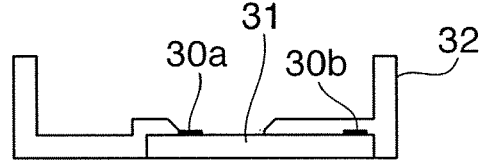
Figure 17C:
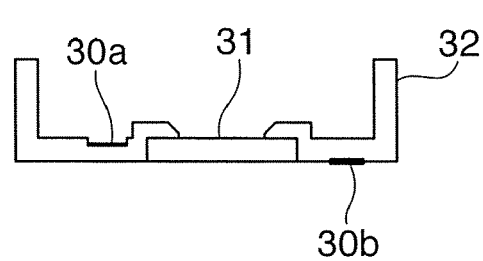
Figure 17G:
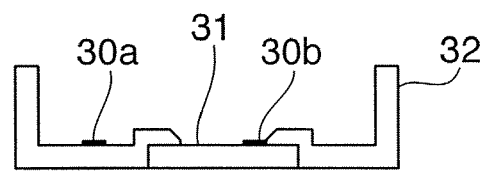
Figure 17D:
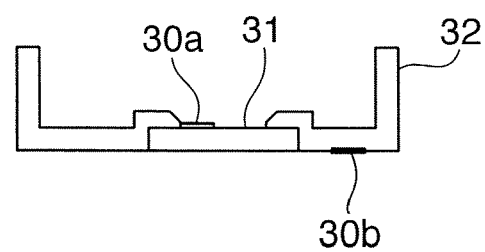

Furthermore, the reference members 30*a* and 30*b* may be disposed on the opposite surface of the contact glass 31 from the original conveying surface of the same as shown in FIG. 17F. Alternatively, as shown in FIG. 17G, the reference members 30*a* and 30*b* may be provided, respectively, on the opposite surface of the glass holding member 32 from the original conveying surface thereof, and on the opposite surface of the contact glass 31 (possessed by opposite side image reading unit 61) from the original conveying surface thereof.

Figure 17H:
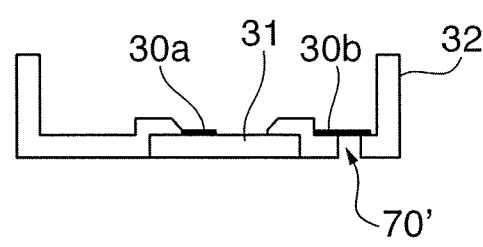
Figure 18:
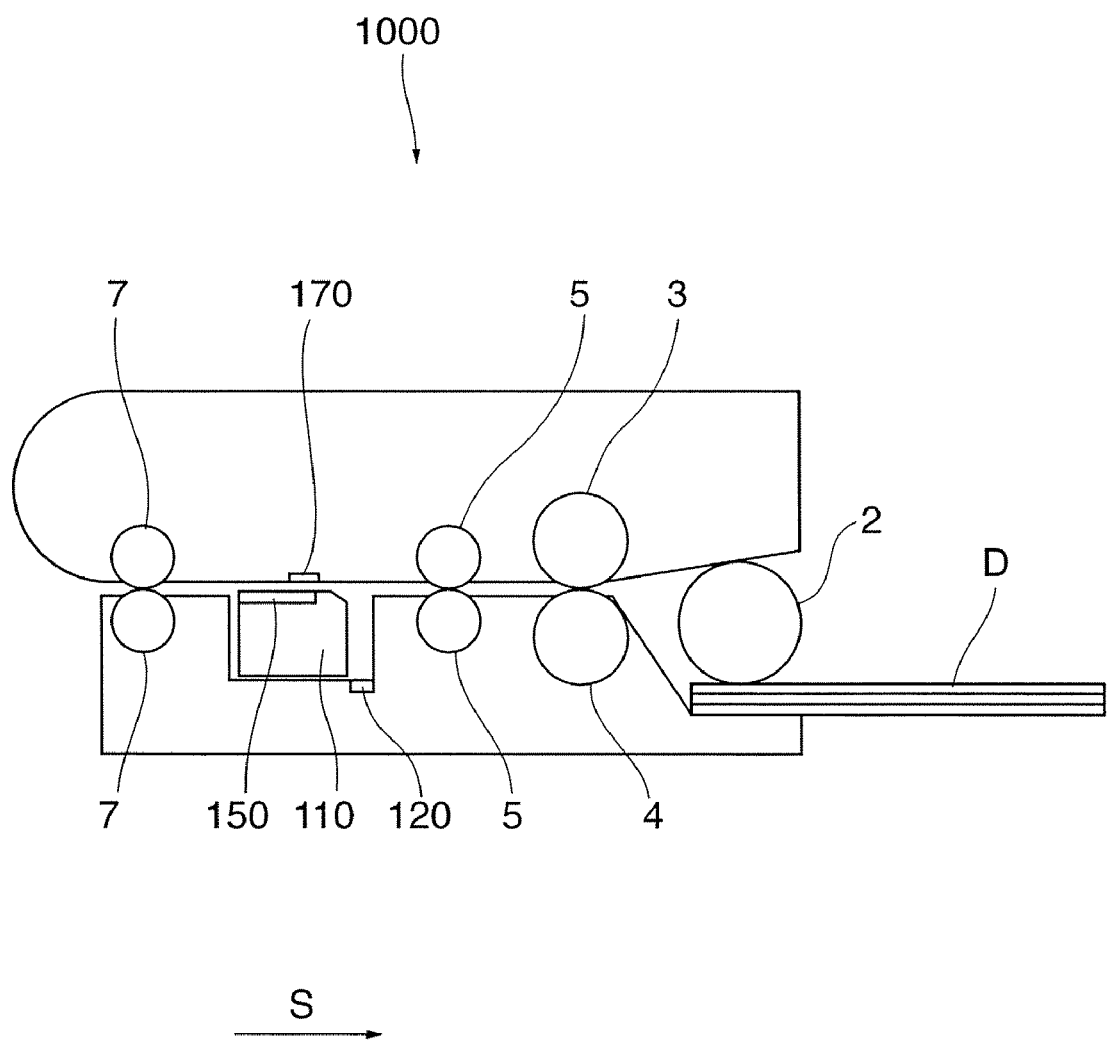
FIG. 18 is a side view showing the internal construction of a conventional image reading apparatus.
Figure 19A:
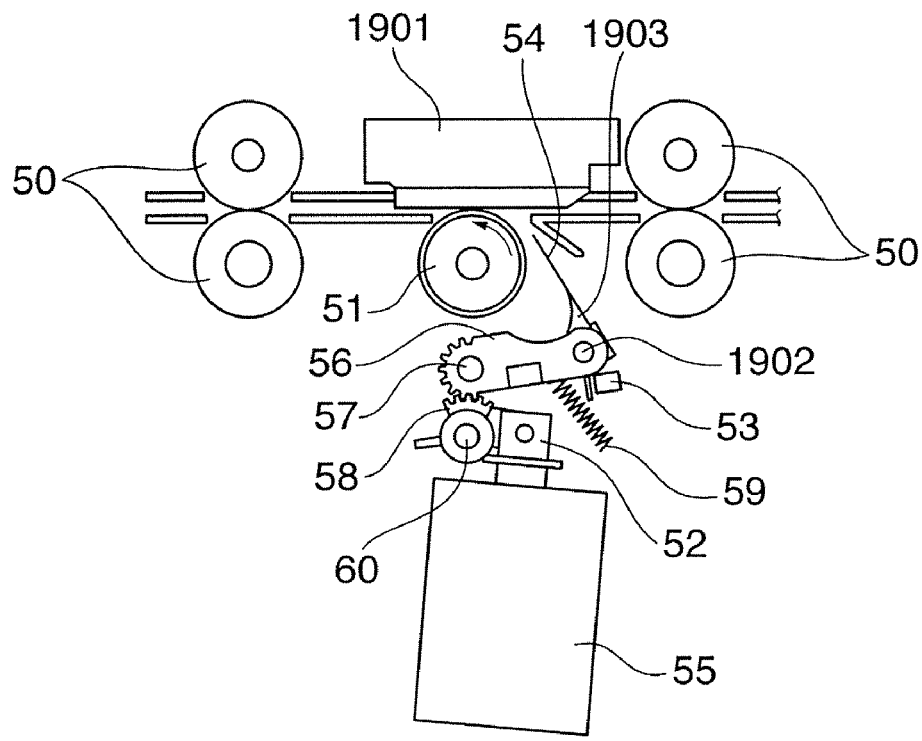
Figure 19B:
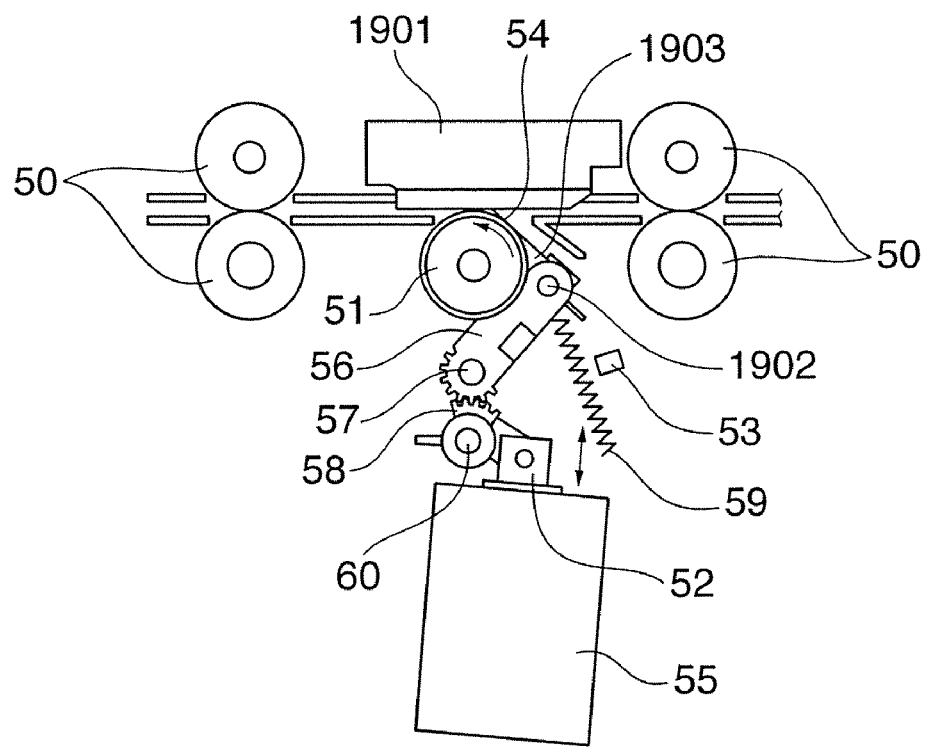

Also, as shown in FIG. 17H, the reference members 30*a* and 30*b* may be provided, respectively, on the opposite surface of the contact glass 31 from the original conveying surface thereof and on the opposite surface of the glass holding member 32 from the original conveying surface thereof.

Referring to FIGS. 17B and 17E, the glass holding member 32 is formed with a hole 70 so that when the reference member 30a reaches the reading position of the image sensor 40 during a shading correction data acquisition period, the image sensor 40 can read the reference member 30a. A hole 70' appearing in FIG. 17H is formed for the same purpose.

According to the present embodiment, the image reading apparatus 1a is provided with the glass holding member 32 for integrally holding the contact glass 31 and the reference members 30a and 30b, and the solenoid 36 for moving the glass holding member 32. When the solenoid 36 is energized, the reference member 30a moves to a position above the original image reading location A, and the reference member 30b moves to a position above the original image reading location B. As a consequence, component parts for moving the reference member 30b to the reading position of the image sensor 40' can be dispensed with, which makes it possible to reduce the total number of component parts of the image reading apparatus 1a, which contributes to cost reduction.

Further, it is possible to acquire original images and shading correction data without moving the image sensors 40 and 40'. This eliminates a problem that cables and the like connecting between the image sensors 40 and 40' and the electric circuit board, not shown, are broken by repetition of movement of the image sensors 40 and 40', which enhances reliability and facilitates assembly.

It is to be understood that the object of the present invention concerning shading correction method may also be accomplished by supplying a system or an apparatus with a storage medium in which a program code of software, which realizes the functions of either of the above described embodiments is stored, and causing a computer (or CPU or MPU) of the system or apparatus to read out and execute the program code stored in the storage medium.

In this case, the program code itself read from the storage medium realizes the functions of either of the above described embodiments, and therefore the program code and the storage medium in which the program code is stored constitute the present invention.

Examples of the storage medium for supplying the program code include a Floppy® disk, a hard disk, a magnetic-optical disk, a CD-ROM, a CD-R, a CD-RW, a DVD-ROM, a DVD-RAM, a DVD-RW, a DVD+RW, a magnetic tape, a nonvolatile memory card, and a ROM. Alternatively, the program may be downloaded via a network.

Further, it is to be understood that the functions of either of the above described embodiments may be accomplished not only by executing the program code read out by a computer, but also by causing an OS (operating system) or the like which operates on the computer to perform a part or all of the actual operations based on instructions of the program code.

Further, it is to be understood that the functions of either of the above described embodiments may be accomplished by writing a program code read out from the storage medium into a memory provided on an expansion board inserted into a computer or a memory provided in an expansion unit connected to the computer and then causing a CPU or the like provided in the expansion board or the expansion unit to perform a part or all of the actual operations based on instructions of the program code.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Applications Nos. 2006-79433, 2006-79435, 2006-79436, 2006-79438 and 2006-79439, all filed Mar. 22, 2006, which is hereby incorporated by reference herein in its entirety.

What is claimed is:

1. An image reading apparatus configured to read an image formed on a side of an original, while conveying the original, comprising:
an image reading unit including a contact glass configured to guide the original to an image reading location, a glass holding member configured to hold said contact glass, an image sensor configured to read the image on the original conveyed to the image reading location, through said contact glass, a reference member disposed at a location different from the image reading location on said contact glass, or on said glass holding member, such that an image of said reference member can be read by said image sensor, and a moving mechanism configured to move said image sensor so that said image sensor can respectively read the original conveyed to the image reading location and said reference member, said image reading unit being fixed to a main body of the image reading apparatus; and
a driving unit configured to drive said moving mechanism from the outside of said image reading unit to move said image sensor, wherein said moving mechanism comprises a traveling member and an urging member,
wherein said traveling member is configured to move said image sensor in a direction different from a longitudinal direction of said image reading unit, and is configured to hold said image sensor such that said image sensor can move between a first position for reading the image on the original and a second position for reading the image of said reference member,
wherein said urging member is configured to urge said traveling member such that said traveling member moves said image sensor to one of the first position and the second position,
wherein said driving unit comprises a pushing member configured to drive said traveling member from the outside of said image reading unit, and a driving power source configured to cause said pushing member to operate,
wherein said driving power source causes said pushing member to operate for driving said traveling member urged by said urging member, whereby said image sensor is moved to the other of the first position and the second position; and
wherein said traveling member is slidably engaged with said image sensor and is moved by said pushing member in a direction substantially orthogonal to a direction in which said image sensor is moved, whereby said image sensor is moved to one of the first position and the second position, and in a state where said traveling member is moved in a direction in which traveling member is urged by said urging member, an end portion of said traveling member protrudes from said image reading unit.

2. An image reading apparatus according to claim 1, wherein said moving mechanism movably holds said reference member.

3. An image reading apparatus according to claim 1, wherein said pushing member is rotatably disposed such that said pushing member comes into contact with said end portion of said traveling member protruding from said image reading unit, and when said driving power source causes said pushing member to operate, said pushing member presses said end portion of said traveling member into said image reading unit.

4. An image reading apparatus according to claim 3, wherein said pushing member has at least one sloping surface formed on a portion thereof for contact with said traveling member.

5. An image reading apparatus according to claim 3, further comprising an original conveying unit configured to convey an original through a space enclosed by a first frame that can be turned around a pivot shaft and a second frame that supports the pivot shaft of said first frame, and a detect means configured to detect the turning motion of said first frame, and
wherein said first frame holds said driving unit, and said second frame, which is part of said main body, holds said image reading unit, control being provided to prevent a driving force of said pushing member caused to operate by said driving power source from acting on said traveling member when the turning motion of said first frame is detected by said detect means.

6. An image reading apparatus according to claim 1, wherein said traveling member is a cam member.

7. An image reading apparatus configured to read an image formed on an original, while conveying the original, comprising:
an image reading unit including an image sensor configured to read an image of an object on a reading position of said image sensor, a contact glass configured to guide the original to a first position, a reference member disposed at a location different from the first position, and a moving mechanism configured to cause relative reciprocating motion varying relative position of the reading position of said image sensor and said reference member, said image reading unit being fixed to a main body of the image reading apparatus;
a driving unit configured to drive said moving mechanism; and
a control unit configured to control driving of said driving unit such that said reading position of said image sensor during a shading correction data acquisition period is set to a second position set on said reference member, and the reading position of said image sensor during an original image data reading period is set to said first position,
wherein said control unit comprises:
a moving-time read data acquisition means configured to acquire moving-time read data generated based on an output signal from said image sensor, while controlling said driving unit to drive said moving mechanism of said image reading unit from the outside of said image reading unit to move said image sensor,
a detection means configured to detect, based on the moving-time read data, that said reading position is at a boundary of a disposition area of said reference member,
a driving amount acquisition means configured to acquire a driving amount of said driving unit required during a time period from a start of said relative reciprocating motion to a time point when said detection part detects that said reading position is at said boundary, and
a driving amount calculation means configured to calculate, based on the acquired driving amount, a first driving amount for use in positioning the reading position of said image sensor to said first position and a second driving amount for use in positioning the reading position to said second position.

8. An image reading apparatus according to claim 7, wherein when the value of said moving-time read data changes across a predetermined threshold value, said detection means detects that the reading position of said image sensor is at the boundary of the disposition area of said reference member.

9. An image reading apparatus according to claim 8, further comprising a light source configured to illuminate the object on the reading position of the image sensor, and an amplifier means configured to amplify the output signal from said image sensor, and
wherein said detection means increases or decreases at least one value of an illuminating light amount of said light source, an amplification factor of said amplifier means, and said threshold value.

10. An image reading apparatus according to claim 7, wherein when said detection means cannot perform the detection, calculation of the first and second driving amounts is suspended until the original is removed from the first position.

11. An image reading apparatus according to claim 7, wherein said control unit causes said moving-time read data acquisition means to perform an operation for acquiring the moving-time read data, over a time period during which there occur a first normal-direction moving-time detection of detecting the boundary of the disposition area of said reference member when the reading position of the image sensor is being moved in a normal direction of two directions of said reciprocating motion toward the reference member, an immediately subsequent reverse-direction moving-time detection of detecting the boundary when the reading position of the image sensor is being moved in a reverse direction of the two directions of said reciprocating motion, and an immediately subsequent second normal-direction moving-time detection of detecting the boundary when the reading position of the image sensor is being moved in the normal direction, and
wherein the calculated second driving amount is equal to an intermediate value between a driving amount required for moving the reading position of the image sensor from said arbitrary initial position until occurrence of the first normal-direction moving-time detection, and a driving amount required for moving the reading position of the image sensor from said arbitrary initial position to occurrence of the immediately subsequent reverse-direction moving-time detection, and
wherein the calculated first driving amount is equal to an intermediate value between a driving amount required for moving the reading position of the image sensor from said arbitrary initial position to the occurrence of the reverse-direction moving-time detection, and a driving amount required for moving the reading position of the image sensor from said arbitrary initial position until occurrence of the second normal-direction moving-time detection.

12. A shading correction method for an image reading apparatus configured to read an image formed on an original, while conveying the original, wherein the image reading apparatus comprises an image reading unit including an image sensor configured to read the image of an object on a reading position of said image sensor, a contact glass configured to guide the original to a first position, a reference member disposed at a location different from the first position, and a moving mechanism configured to cause relative reciprocating motion varying relative position of said reading position and said reference member, said image reading unit being fixed to a main body of the image reading apparatus, and a driving unit configured to drive the moving mechanism, the shading correction method comprising:
a control step of controlling driving of the driving unit such that a reading position of the image sensor during a shading correction data acquisition period is set to a second position set on the reference member, and a reading position of the image sensor during an original image data reading period is set to said first position,
wherein said control step comprises:
a moving-time read data acquisition step of acquiring moving-time read data generated based on an output signal from said image sensor, while controlling said driving unit to drive said moving mechanism of said image reading unit from the outside of said image reading unit to move said image sensor;
a detection step of detecting, based on the moving-time read data, that said reading position is at a boundary of a disposition area of the reference member;
a driving amount acquisition step of acquiring a driving amount of the driving unit required during a time period from a start of said relative reciprocating motion to a time point when said detection means detects that said reading position is at said boundary; and
a driving amount calculation step of calculating, based on the acquired driving amount, a first driving amount for use in varying the reading position of said image sensor to said first position, and a second driving amount for use in varying the reading position of said image sensor to said second position.

13. A non-transitory computer-readable medium on which is stored code of a computer program that, when executed by a computer, causes the computer to execute the shading correction method as claimed in claim 12.

14. An image reading apparatus comprising:
an image reading unit including a frame formed with an opening, said frame being fixed to a main body of the image reading apparatus;
an image sensor disposed inside said frame and configured to read an image on a reading position of said image sensor;
a contact glass configured to guide an original to an original image reading location;
a reference member disposed at a location different from the original image reading location;
a moving mechanism disposed inside said frame and configured to control said image sensor to move so as to reciprocate the reading position of said image sensor between the original image reading location and a shading correction data acquisition position set on said reference member; and
a driving unit configured to drive said moving mechanism from the outside of said image reading unit,
wherein said frame has said contact glass disposed in the opening, and has said image sensor, and said moving mechanism disposed therein,
wherein said moving mechanism comprises a traveling member and an urging member,
wherein said traveling member is configured to move said image sensor in a direction different from a longitudinal direction of said image reading unit, and is configured to hold said image sensor such that said image sensor can move between a first position for reading the image on the original and a second position for reading the image of said reference member,
wherein said urging member is configured to urge said traveling member such that said traveling member moves said image sensor to one of the first position and the second position,
wherein said driving unit comprises a pushing member configured to drive said traveling member from the outside of said image reading unit, and a driving power source configured to cause said pushing member to operate,
wherein said driving power source causes said pushing member to operate for driving said traveling member urged by said urging member, whereby said image sensor is moved to the other of the first position and the second position; and
wherein said traveling member is slidably engaged with said image sensor and is moved by said pushing member in a direction substantially orthogonal to a direction in which said image sensor is moved, whereby said image sensor is moved to one of the first position and the second position, and in a state where said traveling member is moved in a direction in which traveling member is urged by said urging member, an end portion of said traveling member protrudes from said image reading unit.

15. An image reading apparatus configured to read an image formed on an original, while conveying the original, comprising:
an image reading unit including a contact glass configured to guide an original to an image reading location, a glass holding member configured to hold said contact glass, an image sensor configured to read an image formed on a first side of an original conveyed to the image reading location, through said contact glass, a reference member disposed at a location different from the image reading location on said contact glass or disposed at a location on said glass holding member, such that an image of said reference member can be read by said image sensor, and a moving mechanism configured to move said image sensor so that said image sensor can respectively read the original conveyed to the image reading location and said reference member, said image reading unit being fixed to a main body of the image reading apparatus;
a driving unit configured to drive said moving mechanism from the outside of said image reading unit to move said image sensor; and
a second image reading unit including a second image sensor configured to read an image formed on a second side of the original in a second image reading location, a second contact glass configured to guide the original to the second image reading location, a second glass holding member holding said second contact glass, a second reference member disposed at a location different from the second image reading location on said second contact glass or disposed at a location on said second glass holding member, such that an image of said second reference member can be read by said second image sensor, and a second moving mechanism configured to move said second image sensor so that said second image sensor can read the original conveyed to the second image reading location and said second reference member, respectively,
wherein said driving unit is held by a first frame, comprising the main body, supporting said image reading unit or a second frame supporting said second image reading unit, and drives both said moving mechanism in said image reading unit and said second moving mechanism in said second image reading unit,
wherein said moving mechanism comprises a traveling member and an urging member,
wherein said traveling member is configured to move said image sensor in a direction different from a longitudinal direction of said image reading unit, and is configured to hold said image sensor such that said image sensor can move between a first position for reading the image on the original and a second position for reading the image of said reference member, wherein said urging member is configured to urge said traveling member such that said traveling member moves said image sensor to one of the first position and the second position, wherein said driving unit comprises a pushing member configured to drive said traveling member from the outside of said image reading unit, and a driving power source configured to cause said pushing member to operate, wherein said driving power source causes said pushing member to operate for driving said traveling member urged by said urging member, whereby said image sensor is moved to the other of the first position and the second position; and wherein said traveling member is slidably engaged with said image sensor and is moved by said pushing member in a direction substantially orthogonal to a direction in which said image sensor is moved, whereby said image sensor is moved to one of the first position and the second position, and in a state where said traveling member is moved in a direction in which traveling member is urged by said urging member, an end portion of said traveling member protrudes from said image reading unit.

16. An image reading apparatus according to claim 15, wherein said image reading unit is movably supported by said first frame.

17. An image reading apparatus according to claim 15, wherein said second image reading unit is movably supported by said second frame.

18. An image reading apparatus configured to read an image formed on an original, while conveying the original, comprising:

an image reading unit including a contact glass configured to guide the original to an image reading location, a glass holding member configured to hold said contact glass, an image sensor configured to read the image on the original conveyed to the image reading location through said contact glass, a reference member disposed at a location different from the image reading location on said contact glass, or disposed at a location on said glass holding member, such that an image of said reference member can be read by said image sensor, and a moving mechanism configured to move said image sensor so that said image sensor can respectively read the original conveyed to the image reading location and said reference member, said image reading unit being fixed to a main body of the image reading apparatus; and a driving unit configured to drive said moving mechanism from the outside of said image reading unit to move said image sensor, wherein said moving mechanism comprises a traveling member and an urging member, wherein said traveling member is configured to move said image sensor in a direction different from a longitudinal direction of said image reading unit, and is configured to hold said image sensor such that said image sensor can move between a first position for reading the image on the original and a second position for reading the image of said reference member, wherein said urging member is configured to urge said traveling member such that said traveling member moves said image sensor to one of the first position and the second position, wherein said driving unit comprises a pushing member configured to drive said traveling member from the outside of said image reading unit, and a driving power source configured to cause said pushing member to operate, wherein said driving power source causes said pushing member to operate for driving said traveling member urged by said urging member, whereby said image sensor is moved to the other of the first position and the second position; and wherein said traveling member is slidably engaged with said image sensor and is moved by said pushing member in a direction substantially orthogonal to a direction in which said image sensor is moved, whereby said image sensor is moved to one of the first position and the second position, and in a state where said traveling member is moved in a direction in which traveling member is urged by said urging member, an end portion of said traveling member protrudes from said image reading unit.

19. An image reading apparatus according to claim 18, wherein said moving mechanism includes a cam member configured to hold said image sensor such that said image sensor can be moved between a first position for reading the image on the original and a second position for reading said reference member.

* * * * *